United States Patent
Cheung

(10) Patent No.: US 12,311,256 B2
(45) Date of Patent: May 27, 2025

(54) USING EYE-TRACKING / EYE METRICS TO DETECT VR EYE-STRAIN-LEVELS, THEN USING ADAPTIVE RENDERING TO LOWER LEVELS OF EYE-STRAIN

(71) Applicant: Sony Interactive Entertainment Inc., Tokyo (JP)

(72) Inventor: Edward Cheung, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 170 days.

(21) Appl. No.: 18/175,948

(22) Filed: Feb. 28, 2023

(65) Prior Publication Data

US 2024/0286026 A1    Aug. 29, 2024

(51) Int. Cl.
*A63F 13/212*    (2014.01)
*A63F 13/213*    (2014.01)
(Continued)

(52) U.S. Cl.
CPC .......... *A63F 13/213* (2014.09); *A63F 13/212* (2014.09); *A63F 13/67* (2014.09); *G06F 3/012* (2013.01); *G06F 3/013* (2013.01)

(58) Field of Classification Search
CPC ...... A63F 13/212; A63F 13/213; A63F 13/67; A63F 13/25; A63F 13/65; A63F 13/79; A63F 2300/1012; A63F 2300/1087; A63F 2300/66; A63F 2300/8082; A63F 13/211; A63F 13/00; G06F 3/013; G06F 1/163; G06F 3/012; G06F 3/011; G06F 3/014; G06F 3/017; G02B 27/017; G02B 2027/0132; G06N 20/00; G06T 19/006; G06V 40/18
See application file for complete search history.

(56) References Cited

U.S. PATENT DOCUMENTS 10,065,118 B1 *    9/2018    Kamath ................ G06F 3/0484
10,195,531 B2 *    2/2019    Osman .................. A63F 13/795
(Continued)

FOREIGN PATENT DOCUMENTS

CN    113887386 A    1/2022
KR    101955293 B1    3/2019
TW    I684438 B    2/2020

OTHER PUBLICATIONS

Intl Search Report and the Written Opinion, PCT/US2024/016563, Dated Jul. 4, 2024, Total 13 pages.
(Continued)

*Primary Examiner* — Vijay Shankar
(74) *Attorney, Agent, or Firm* — Kilpatrick Townsend & Stockton LLP

(57) ABSTRACT

Methods and system for providing assistance to a user during interaction with game content of a video game includes monitoring eye strain indicators of the user as the user is interacting with the game content. Eye strain metrics are computed using the eye strain indicators collected for the user. An action for performing at the video game is identified based on the eye strain metrics. The identified action is forwarded to the video game, which, upon receipt, executes a command to adjust one or more rendering attributes of the game content presented to the user. The adjustment is defined to reduce the eye strain of the user.

22 Claims, 10 Drawing Sheets

(51) Int. Cl.
    *A63F 13/67*       (2014.01)
    *G06F 3/01*        (2006.01)

(56) References Cited

U.S. PATENT DOCUMENTS

| | | | |
|---|---|---|---|
| 10,828,566 B2 * | 11/2020 | Krishnamurthy | A63F 13/5375 |
| 11,128,636 B1 * | 9/2021 | Jorasch | G06F 3/0346 |
| 11,580,938 B2 * | 2/2023 | Welsch | G06F 1/3265 |
| 2014/0292637 A1 | 10/2014 | Peng et al. | |
| 2016/0080720 A1 | 3/2016 | Fullam | |
| 2017/0127040 A1 | 5/2017 | Khabiri et al. | |
| 2021/0086089 A1 * | 3/2021 | Pardeshi | G06N 3/04 |
| 2022/0217325 A1 | 7/2022 | Lee et al. | |
| 2022/0374078 A1 | 11/2022 | Parshionikar | |
| 2024/0302902 A1 * | 9/2024 | Sangston | G06F 3/011 |

OTHER PUBLICATIONS

ITW IPO Search Report, TW Application No. 113106550, Dated Aug. 20, 2024, Total 1 page.

\* cited by examiner

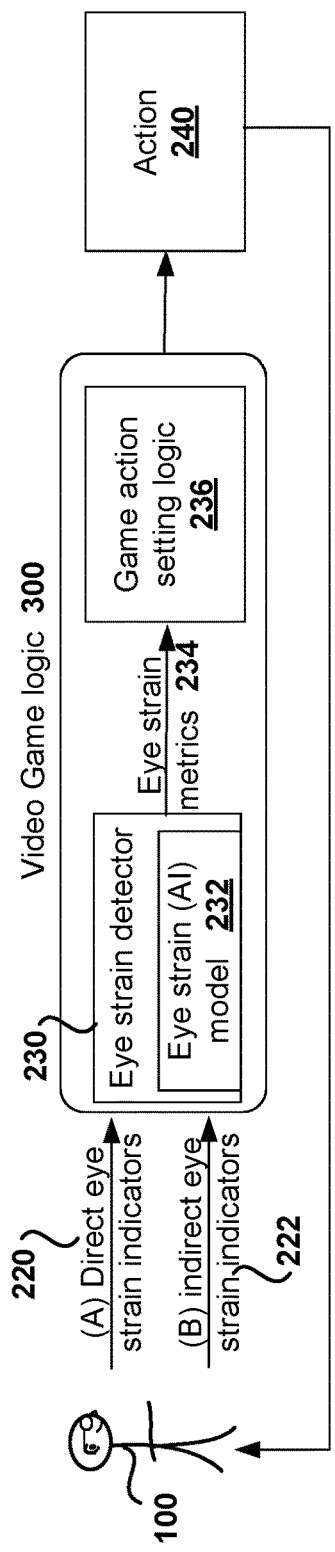
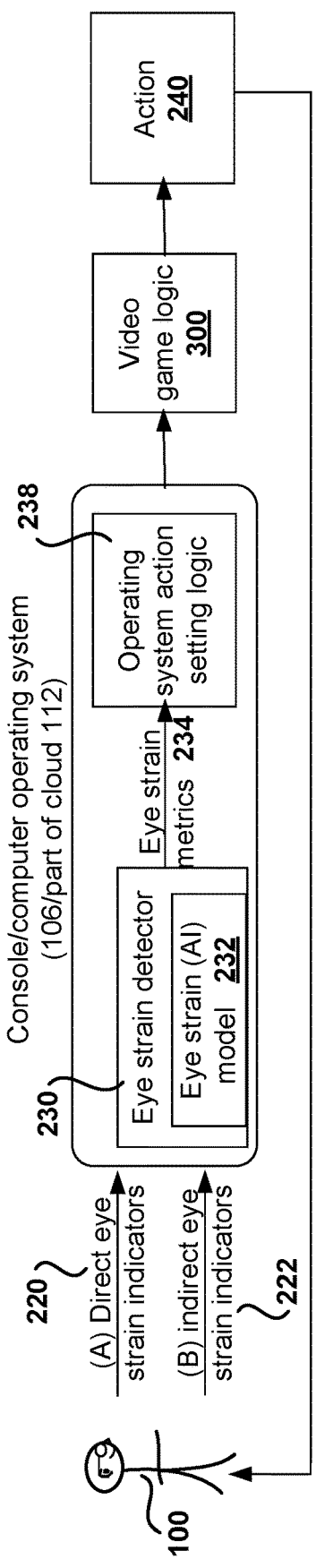
Figure 2A
Figure 2B

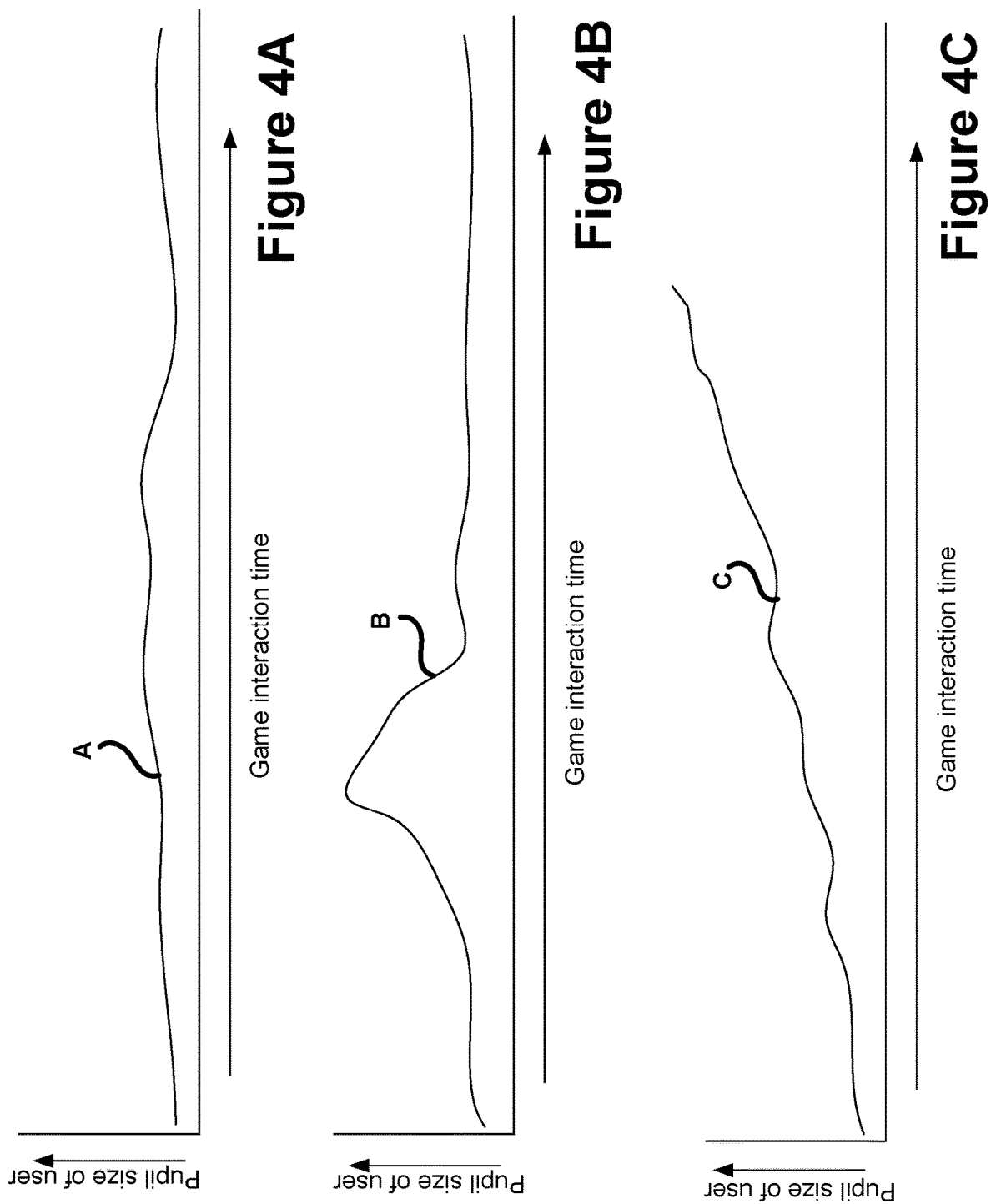

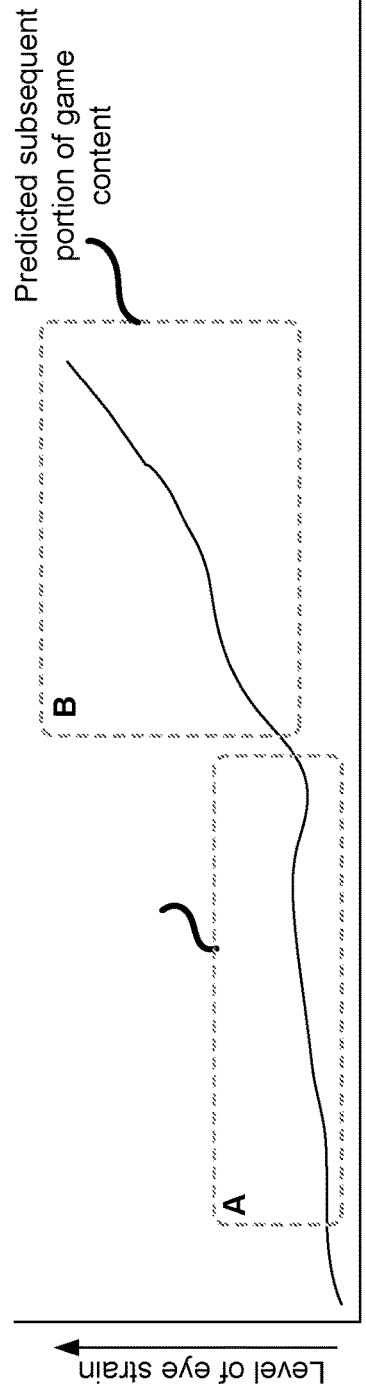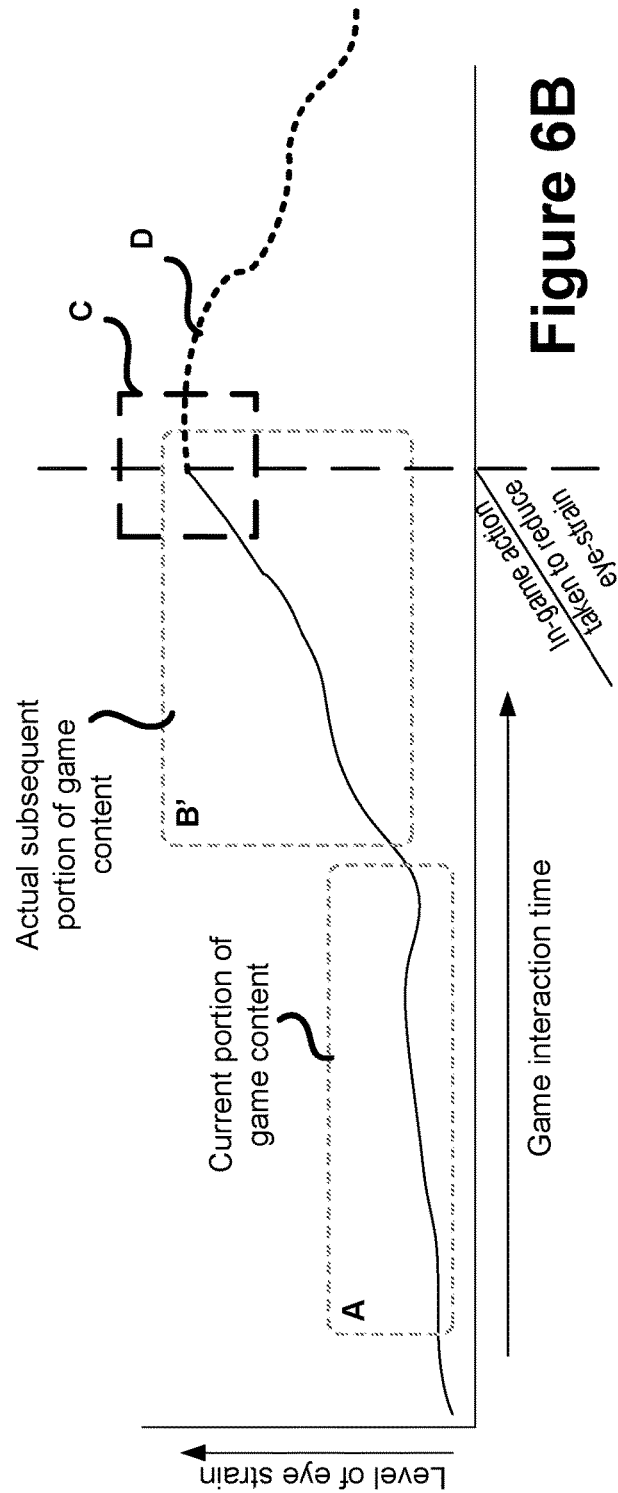

USING EYE-TRACKING / EYE METRICS TO DETECT VR EYE-STRAIN-LEVELS, THEN USING ADAPTIVE RENDERING TO LOWER LEVELS OF EYE-STRAIN

BACKGROUND OF THE INVENTION

1. Field of the Invention

The present disclosure relates to tracking attributes of the eyes to determine eye strain experience by a user and to adjust rendering attributes of the content to reduce eye strain of the user.

2. Description of the Related Art

Virtual reality (VR) devices are growing in popularity as the users are able to fully immerse themselves in viewing content presented thereon. The immersive experience is enabled with use of headsets, such as head mounted displays, smart eyeglasses, etc. However, adopting the VR to have a fully immersive experience comes with a cost to the users. For instance, the headsets are heavy and bulky making it difficult for the users to use it for a prolonged period of time. The proximity of the lenses and display screens cause issues, such as eye-strains and motion sickness. Further, prolonged use of these devices cause dryness and/or redness in the eyes. Such issues prevent the users from using the VR devices on a regular basis or at all.

It is in this context that embodiments of the invention arise.

SUMMARY OF THE INVENTION

Implementations of the present disclosure relate to systems and methods for collecting eye strain indicators by monitoring and capturing changes to eye features of the user as the user is interacting with content rendered on a wearable device, such as a head mounted display (HMD). The captured eye strain indicator data is analyzed in substantial real-time to determine eye strain metrics, which are used to detect eye-strain and a level of eye-strain experienced by the user. In response to determining eye strain in the user, an action to adjust one or more rendering attributes of the content is identified and forwarded to an interactive execution providing the content. Responsive to receiving the action, the interactive application performs the action. The action includes a command to dynamically adjust the select ones of the rendering attributes of the content identified to cause eye strain. The adjusted content is forwarded by the interactive application to the HMD for rendering. The adjusted content includes rendering attributes that reduce the eye strain of the user so that the user can interact with the content for an extended period.

In one implementation, a method for assisting a user wearing a head mounted display (HMD) during interaction with a video game is disclosed. The method includes monitoring eye strain indicators of the user as the user is interacting with game content of the video game rendered at a display screen of the HMD. The eye strain indicators are collected from images of eyes and other facial features of the user captured by a plurality of sensors distributed within a physical environment in which the user operating. The eye strain indicators are used to compute eye strain metrics for the user. The eye strain metrics provide details that can be used to determine a level of eye strain experienced by the user. Based on the computed eye strain metrics, an action to be performed on the game content is identified. The action identifies one or more rendering attributes associated with the game content of the video game that needs to be adjusted and a command to adjust the identified one or more rendering attributes. The action is forwarded to the video game. The video game, in response to receiving the action, executes the command to adjust the one or more rendering attributes of the game content. The adjusted game content is forwarded to a display screen of the HMD for rendering so as to reduce the eye strain of the user as the user is engaged in interacting with the content.

In an alternate implementation, a method for assisting a user during interaction with a video game is disclosed. The method includes monitoring eye strain indicators of the user as the user is interacting with a first portion of game content of the video game. The eye strain indicators are collected from a plurality of sensors distributed within a physical environment in which the user is operating. Eye strain metrics for the user are computed using the eye strain indicators collected by the sensors. The eye strain metrics are used to determine a level of eye strain experienced by the user as the user is interacting with the first portion of the game content. A second portion of the game content that is predicted to occur after the first portion is identified. The second portion of the game content is examined to determine if the second portion includes one or more rendering attributes that are known to cause eye strain for the user. The second portion of the game content is identified based on game state of the game content included in the first portion and the interactivity of the user in the first portion. An action is identified and forwarded to the video game. The action includes a command to adjust select ones of the one or more rendering attributes of the game content included in the second portion of the video game that are likely to cause the eye strain. The action is identified based on the one or more rendering attributes used to present the first portion of the game content and the one or more rendering attributes identified for the game content included in the second portion. When the content of the second portion is detected to be selected for rendering following the rendering of the game content of the first portion and in response to receiving the action, the video game executes the command to dynamically adjust the select ones of the one or more rendering attributes for the game content included in the second portion prior to forwarding the game content of the second portion to the HMD for rendering.

Other aspects of the present disclosure will become apparent from the following detailed description, taken in conjunction with the accompanying drawings, illustrating by way of example the principles of embodiments described in the present disclosure.

BRIEF DESCRIPTION OF THE DRAWINGS

FIG. 2A illustrates a simplified flow of data using some of the components of a system used for collecting and processing eye gestures of the user to define eye strain metrics and to identify an action for forwarding to an application to adjust rendering attributes of the content forwarded to the wearable device for rendering, in accordance with one implementation.

FIG. 2B illustrates a simplified flow of data using some of the components of a system used for collecting and processing eye gestures of the user to define eye strain metrics and to identify an action for forwarding to an application to adjust rendering attributes of the content forwarded to the wearable device for rendering, in accordance with an alternate implementation.

FIGS. 4A-4C illustrate sample graphs that are generated by plotting an eye strain metric for a specific rendering attribute against game interaction time, in accordance with some implementations.

FIGS. 6A-6B illustrate sample graphs of a level of eye strain experienced by the user over game interaction time and an in-game action taken to reduce the eye strain of the user, in accordance with an alternate implementation.

DETAILED DESCRIPTION

Figure 1:
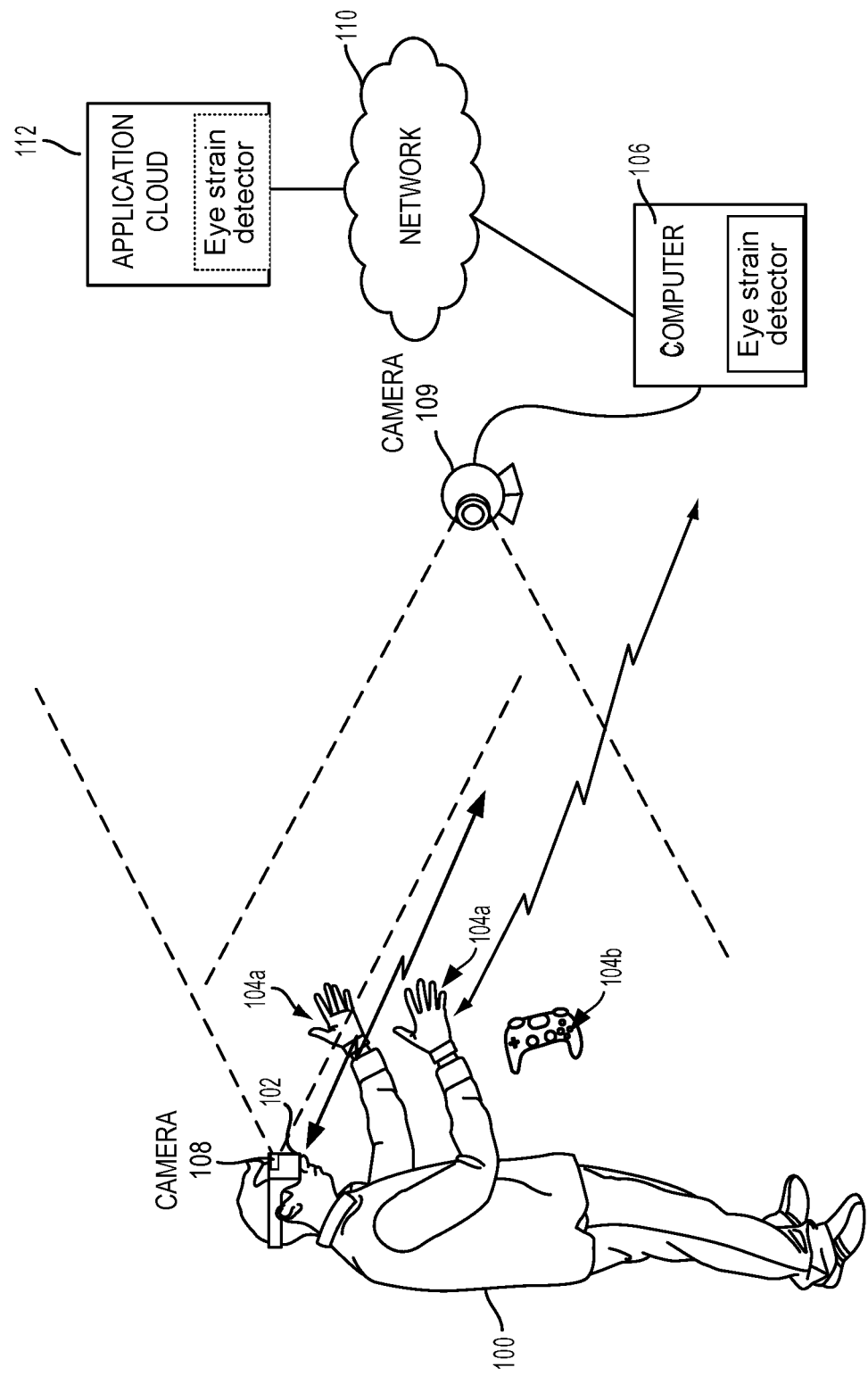
FIG. 1 represents a simplified block diagram of a system that includes a wearable device worn by a user as the user is interacting with content provided by a computer, in accordance with one implementation.

Systems and method for adjusting rendering attributes of content presented to a user at a client device are described. It should be noted that various implementations of the present disclosure are practiced without some or all of the specific details. In other instances, well known process operations have not been described in detail in order not to unnecessarily obscure various embodiments of the present disclosure.

The various implementations described herein allow an eye strain detector module executing on a server computing system to monitor eye strain indicators of the user as the user is interacting with content of an interactive application rendering on a display screen associated with a wearable device, such as a head mounted display (HMD), and use the eye strain indicators to compute eye strain metrics. The eye strain metrics provide sufficient details to determine a level of eye strain experienced by the user as the user is interacting with the content rendered on the screen of the HMD. The content can be streaming game content generated by the video game in response to game inputs provided by the user. Based on the level of eye strain experienced by the user, an action may be identified and forwarded to the video game for execution. The action may be identified based on the eye strain metrics and include a command to adjust one or more rendering attributes of the game content that are identified to cause the eye strain for the user during interaction with the game content. By adjusting the rendering attributes of the game content, the eye strain of the user can also be reduced allowing the user to extend use of the HMD.

The eye strain indicators are captured using a plurality of sensors and image capturing devices distributed in a physical environment in which the user is operating when interacting with the game content of the video game. The eye strain indicators are processed within the HMD and forwarded to a computer or console that is executing the video game and providing the game content. The computer or console can be local or remote to the user. An eye strain detector engine executing within the computer or console is used to analyze the eye strain indicators to define eye strain metrics, which are then used by the eye strain detector engine to identify an action to be performed on the game content. The action may be to adjust select ones of rendering attributes of the game content that are known to cause the level of eye strain identified for the user. The action is forwarded to the video game for adjusting the content. The action includes a command that is to be executed at the video game. In response to receiving the action, the video game is configured to interpret the command identified in the action, identify select ones of the rendering attributes of the game content that are to be adjusted, verify that the select ones of the rendering attributes identified for adjusting is included in the subsequent portion of the game content, and execute the command upon successful verification. The subsequent portion of the game content with the adjusted select ones of the rendering attributes is forwarded to the HMD for rendering.

Each user can have different tolerance or sensitivity levels for the different rendering attributes of the content. Consequently, the eye strain metrics are user-specific and are identified based on each user's tolerance/sensitivity level to the different rendering attributes of the content. Further, the amount by which the rendering attributes of the game content are to be adjusted is also driven by the tolerance or sensitivity level of the user. In some cases, the amount of adjustment may be further driven by the visual characteristics of the user. The adjusted content is shown to be include the game content with rendering attributes that reduce the eye strain for the user. In some embodiments, the eye strain detector engine is provided at the application level, such as at the video game level. In alternate embodiments, the eye strain detector engine is provided at the platform level (e.g., operating system level of a computer or console (local or remote).

Throughout the specification, various embodiments have been described with reference to "video game". The embodiments are not restricted to the video game but can be extended to represent any type of interactive application that is directed through execution of input commands. For illustration purposes only, an interactive application includes applications for gaming, word processing, video processing, video game processing, etc.

With the general understanding of the disclosure, specific implementations of providing assistance to the user will now be described in greater detail with reference to the various figures. It should be noted that various implementations of the present disclosure can be practiced without some or all of the specific details. In other instances, well known process operations have not been described in detail in order not to unnecessarily obscure various embodiments of the present disclosure.

FIG. 1 illustrates a simplified block diagram of an example system in which a wearable device is used to monitor and capture eye strain indicators of the user as the user is interacting with content rendered at a display screen of the wearable device and to use the eye strain indicators to define eye strain metrics for the user. The eye strain metrics are used to define eye strain and a level of eye strain experienced by the user. Based on the level of eye strain experienced by the user, certain ones of the rendering attributes of the content are adjusted. The system of FIG. 1 is shown to be used by the user for interacting with game content of a video game application but can also be extended to interact with streaming content of an augmented reality application or mixed reality application or any other type of interactive application.

A user 100 is shown wearing a wearable device (e.g., head mounted display (HMD)) 102. The HMD 102 is worn in a manner similar to glasses, goggles, or a helmet, and is configured to render content from a video game or other interactive application on a display screen associated with the HMD 102 for the user 100 to view and interact. In an alternate implementation, in place of the HMD 102, the user 100 may be wearing a pair of smart eyeglasses with a display screen used for rendering content of an augmented reality application or other interactive application. Considering the implementation where the wearable device worn by the user is the HMD 102, the HMD 102 provides a very immersive experience to the user by virtue of its provision of display mechanisms in close proximity to the user's eyes. The HMD 102 can provide display regions to each of the user's eyes which occupy large portions or even the entirety of the field of view of the user. Optics provided in the HMD 102 enable the user to view the content rendered in close proximity to the user's eyes. The optics takes into consideration the visual characteristics of the user when presenting the content to the user.

In one embodiment, the HMD 102 is connected to a computer. The computer may be a local computer 106 (e.g., gaming console) or a computer that is part of an application cloud 112 that is located remote to the HMD 102. As a result, the connection between the HMD 102 and the computer may be wired or wireless. The computer (106/or part of cloud 112) can be any general or special purpose computer known in the art, including but not limited to, a gaming console, personal computer, laptop, tablet computer, mobile device, cellular phone, tablet, thin client, part of a set-top box, media streaming device, virtual computer, remote server computer, etc. With regards to remote server computer (i.e., part of cloud 112), the server computer may be a cloud server within a data center of an application cloud system. The data center includes a plurality of servers that provide the necessary resources to host one or more interactive applications that provide the content to the HMD 102 for rendering. The interactive application may be a distributed application that can be instantiated on one or more cloud servers within one data center or distributed across multiple data centers, and when instantiated on a plurality of cloud servers, the data of the interactive application is synchronized across the plurality of cloud servers.

In one embodiment, the interactive application may be a video game application (i.e., virtual reality (VR) application) or an augmented/mixed reality (AR) application, and the computer is configured to execute an instance of the video game application or the AR application, and output the video and audio data from the video game application or the AR application for rendering on a display screen associated with the HMD 102. In another implementation, the server may be a stand-alone server 106 that is capable of executing an instance of the interactive application, or may be a server that is configured to manage one or more virtual machines that is capable of executing an instance of the interactive application (e.g., AR application or video game application) and provide the content for rendering, in real-time or delayed time.

Alternately, the server may include a plurality of consoles and an instance of the video game may be accessed from one or more consoles (e.g., game consoles). The consoles may be independent consoles or may be rack-mounted server or a blade server. The blade server, in turn, may include a plurality of server blades with each blade having required circuitry and resources for instantiating a single instance of the video game application, for example, to generate the game content data stream. Other types of cloud servers, including other forms of blade server may also be engaged for executing an instance of the interactive application (e.g., video game application) that generates the content of the interactive application (e.g., game content data stream). For sake of simplicity, various embodiments will be discussed with reference to adjusting content of a VR application but can be extended to adjust content of an AR or mixed reality (MR) application as well.

The user 100 may operate a glove interface object 104*a* or a controller 104*b* or other input devices (e.g., keyboard, mouse, etc., not shown) or input interfaces associated with the HMD 102 to provide input for the interactive application, such as the video game. Additionally, image capturing devices, such as camera 108 disposed on the outside surface of the HMD 102, one or more external cameras (109) that are disposed outside of the HMD and within the physical environment, internal cameras (cameras disposed on inside surfaces of the HMD 102) (not shown), etc., can be configured to capture images of the interactive environment in which the user 100 is located as well as the eye and other facial features of the user as the user is interacting with the content. The images capturing the eye features can be analyzed to determine various eye strain indicators. The eye strain indicators can be verified using images of other facial features and the images of the interactive environment, which are used to identify the location, position, orientation, and/or movements of the user 100, the HMD 102, the glove interface object 104*a*, the controller 104*b* and/or other input devices, and other real-world objects. In one embodiment, the input devices, such as the glove interface object 104*a*, the controller 104*b*, etc., include visual indicators, such as a light, which can be tracked to determine their respective location and orientation. The image capturing devices encompass one or more cameras 108, multiple image capturing devices (e.g. stereoscopic pair of cameras), an IR camera, a depth camera, or any two or more combinations thereof.

The controller 104*b* can be a single-handed controller (i.e., a controller that can be operated using a single hand of a user) or a two-handed controller (i.e., a controller that can be operated using both hands of the user). As noted, the controllers can be tracked by tracking lights associated with the controllers, or tracking shapes and/or inertial data provided by sensors associated with the controllers. Using these various types of controllers, or even simply hand gestures that are made by the user and captured by one or more cameras, it is possible to interface, control, maneuver, interact with, and participate in the virtual reality environment presented on a display screen associated with the HMD 102.

The HMD 102 are tracked using embedded sensors, and/or one or more lights, other indicators (e.g., visual markers), wherein the data from the tracking can be used to identify the location and orientation of the HMD 102 within the physical environment where the user is operating. In addition to the camera 108 and other image capturing devices, one or more microphones are also included to capture sound from the interactive environment. Sound captured by the one or more microphones may be processed to identify the location of a sound source (e.g., audio produced by the user, other users, or other sound sources). The sound captured by the microphones in the identified location can be selectively filtered, utilized or processed to the exclusion of other sounds not from the identified location.

The computer 106, in some embodiments, functions as a thin client in communication over a network 110 with an application cloud 112 or a server computing device executing an interactive application or augmented reality application. In the case of the interactive application being a video game application selected for game play by the user 100, a server of the application cloud 112 maintains and executes an instance of the video game using the processor of the server or the processor of a different server or instantiates the video game on the computer 106. In the case where the video game is executed on the application cloud 112, the computer 106 transmits inputs from the HMD 102, the glove interface object 104*a* and the image capturing devices (e.g., camera 108 and other cameras), to the server on the application cloud 112, which processes the inputs to affect the game state of the executing video game. The output from the executing video game, such as video data, audio data, and haptic feedback data, is transmitted by the server of the application cloud 112 to the computer 106. The computer 106 may further process the data received from the server of the application cloud 112 before transmission or may directly transmit the data to the relevant devices for rendering. For example, video and audio data streams may be provided to the HMD 102, whereas haptic feedback data is provided to the glove interface object 104*a* and/or controller.

In one embodiment, the HMD 102, glove interface object 104*a*, controller 104*b*, and image capturing devices, such as camera 108, etc., may themselves be networked devices that independently and directly connect to the network 110 to communicate with the server at the application cloud 112. For example, the computer 106 may be a local network device, such as a router, that does not otherwise perform video game processing, but which facilitates passage of network traffic. The connections to the network by the HMD 102, glove interface object 104*a*, controller 104*b*, and camera 108 may be wired or wireless.

Additionally, the various implementations of the present disclosure described with reference to a head mounted display 102 can be extended to other wearable devices or interactive devices, including without limitation, pair of eyeglasses, mobile devices (e.g., smart phones, tablet computing devices, etc.), or handheld devices. In the various implementations, the screen on which the content of the interactive application is being rendered for the user wearing the HMD to view may be a display screen of the HMD or an external display screen that is communicatively connected to the HMD 102. The external display screen may be a LCD display screen, a display screen associated with a portable computing device, such as a screen of a tablet computing device, screen of a mobile phone, etc., to which the HMD 102 is communicatively connected, or an external surface on which the content can be projected.

In one implementation, the HMD 102 includes a plurality of sensors and image capturing devices that are used to capture changes in the eye features and other facial features of the user as the user is interacting with the content presented at the display screen of the HMD 102. Some of the sensors used to capture the other facial features include inertial measurement unit (IMU) sensors, such as accelerometers, magnetometers, gyroscopes, global positioning system tracker, etc. Image capturing devices include forward facing cameras 108 disposed on the outer surface of the HMD 102, cameras disposed on the inside surface of the HMD 102 and directed toward the eyes and other facial features of the user, external cameras facing the user and disposed in the physical environment in which the user wearing the HMD 102 is operating, depth cameras, etc. The changes in the eye features and other facial features may be in response to the content being rendered on the HMD 102. Data collected by tracking the changes in the eye features of the user include data related to changes in the shape of the eyes, view direction, motion of the eyes, speed of motion of the eyes, pupil size, blink pattern, redness of the eyes, etc. Changes to some of the eye features can potentially cause eye strain to the user and changes to such eye features are therefore referred to as eye strain indicators. Changes to the eye strain indicators of the user are used to compute eye strain metrics, such as type of eye strain (e.g., redness factor, blink rate, squinting, etc.), level of eye strain (e.g., level of redness, squinting intensity), factor(s) likely to have caused eye strain, etc.

Data collected by tracking changes to the HMD 102 can be used to determine the location, orientation, direction, movement, speed of movement of the HMD 102 in the physical environment and therefore of the head of the user wearing the HMD 102. The changes in the other facial features can be used to track expressions of the user. The changes to the other facial features are used to validate the eye strain metrics computed from the changes detected in the eye features. The eye strain indicators captured by the sensors and the computed eye strain metrics are associated with the content using temporal data of the content. In addition to the eye strain indicators captured by the sensors, the sensors can also capture audio input of the user during the user's interaction with the game content. The audio input may be captured using the microphones and used as an additional input to reinforce the eye strain indicators captured by the sensors. The content and the temporal data can be used to determine the type of content that is being rendered at different times and the rendering attributes of the content at the time the changes in the eye strain indicators were captured by the sensors.

The computed eye strain metrics are then used to identify an action that corresponds with the eye strain and a level of the eye strain, and forward the action to the video game application. The action is interpreted by the video game to identify specific ones of the rendering attributes that correspond with the eye strain and the level of the eye strain experienced by the user. In response to receiving the action, the video game application can perform the action by executing a command included therein. The action can be a corrective action wherein the specific ones of the rendering attributes of the content that are known to cause eye strain to the user, are adjusted. The adjusted content is forwarded to the HMD for rendering to the user. The adjusted content assists in reducing the eye strain of the user.

The eye strain indicators collected by the various sensors and used to detect eye strain and the level of eye strain experienced by the user, are forwarded directly to an eye strain detector engine (not shown in FIG. 1) for further processing. In some implementations, the eye strain detector engine is available at the application level. In these implementations, the eye strain detector engine can be integrated into the game logic or interact with the game logic to determine the eye strain metrics and to identify a corrective action the video game can take to identify and adjust the rendering attributes of the content so as to reduce the eye strain for the user. In alternate implementations, the eye strain detector engine can be available at the platform level. In these alternate implementations, the eye strain detector engine is a software program that is embedded within the operating system of the computer and is used to determine the eye strain metrics and to identify the action that the video game can take to reduce the eye strain for the user. The identified action is forwarded by the operating system to the video game system to allow the video game to perform the action, wherein the action may be a corrective action that is performed to the content generated by the video game so as to reduce the eye strain for the user. In some implementations, the eye strain detector engine is defined is a firmware.

FIG. 2A illustrates an embodiment wherein the eye strain detector engine 230 is defined at an application level by embedding the eye strain detector engine 230 within game logic 300 of the video game. In alternate embodiment, the eye strain detector is an independent software program or a software program that is included with other software programs and is configured to interact with the game logic 300 of the video game. As shown, various sensors and image capturing devices are used to collect data related to eye strain indicators by capturing changes to the eye features and other facial features of the user. The data captured by the sensors can be broadly classified into direct eye strain indicators 220 and indirect eye strain indicators 222. In one embodiment, the direct eye strain indicators 220 are eye and facial features that are observed and captured by the sensors, whereas the indirect eye strain indicators 222 are derived from the direct eye strain indicators 220. For example, the direct eye strain indicators 220 can relate to blink pattern, size of pupil, shape of the eyes, location of the eyes, motion of the eyes, direction of motion, etc. The indirect eye strain indicators 222 can be computed from the direct eye strain indicators 220, such as level of squinting, dry eyes, redness factor, etc. The level of squinting can be determined, for example, by monitoring the shape of the eye over time.

The eye strain detector uses both the direct eye strain indicators 220 (i.e., indicators captured by the sensors/image capturing devices) and indirect eye strain indicators 222 (i.e., indicators derived from the direct eye strain indicators 220) collected from the sensors and/or derived from the direct eye strain indicators 220 to compute eye strain metrics 234. The eye strain detector can engage an eye strain artificial intelligence (AI) model to compute eye strain metrics 234 of the user as the user is interacting with a current portion of the game content. The computed eye strain metrics 234 are forwarded to game action setting logic 236 available within the game logic 300 to interpret the eye strain metrics 234, identify the rendering attributes of the currently rendering portion of the game content, identify the rendering attributes of a subsequent portion of the game content, identify specific ones of the rendering attributes in the subsequent portion that are known to cause the eye strain for the user, and execute a command included with the action 240 to adjust specific ones of the rendering attributes of the subsequent portion of the game content. The specific ones of the rendering attributes are identified for adjustment when the eye strain detectors identified from the currently rendering portion are above a predefined level and therefore need to be adjusted in the subsequent portion of the content. The action 240 is initiated upon successful verification that the specific ones of the rendering attributes used for rendering the subsequent portion continue to be rendered at the same level as current portion of the game content. Each of the rendering attributes for the subsequent portion is adjusted by a level that is identified in the command. The subsequent portion with the adjusted rendering attributes is then forwarded to the HMD of the user 100 for rendering. The adjusted rendering attributes assist the user in viewing the content without straining their eyes.

FIG. 2B illustrates an alternate embodiment wherein the eye strain detector engine 230 is made available at a platform level by incorporating the eye strain detector engine 230 within the operating system. The difference between the embodiment illustrated in FIG. 2B and the one illustrated in FIG. 2A, is that the eye strain detector engine 230 in FIG. 2B is part of the operating system of the computer whereas in the embodiment illustrated in FIG. 2A, the eye strain detector engine 230 is part of the game logic 300 (or can be part of another interactive application with access to the game logic 300). As with the embodiment illustrated in FIG. 2A, the eye strain detector in FIG. 2B receives the direct eye strain indicators 220 collected from the various sensors/image capturing devices and the indirect eye strain indicators 222 derived from the direct eye strain indicators 220. The collected and derived eye strain indicators are then used by and eye strain (AI) model within the eye strain detector engine 230 to compute the eye strain metrics 234. The eye strain metrics 234 thus computed are forwarded to an operating system action setting logic 238. The operating system action setting logic 238 identifies, (a) the various rendering attributes of a current portion of the content presented at the HMD, (b) specific ones of the rendering attributes that are above a predefined level and are likely to cause eye strain if the eyes are exposed to the specific ones of the rendering attributes for an extended time, (c) the rendering attributes used for presenting a subsequent portion of the content, and (d) if the specific ones of the rendering attributes that were above the predefined level in the current portion are included in the subsequent portion. When the operating system action setting logic 238 determines that the specific ones of the rendering attributes that are above the predefined level are also included in the subsequent portion, the operation system action setting logic 238 identifies an action 240 that corresponds with adjusting the specific ones of the rendering attributes and forwards the action 240 to the video game system for execution. The action 240 includes a command that signals the video game to dynamically adjust the specific ones of the rendering attributes of the subsequent content generated by the video game. The command can include instructions to the video game to adjust the subsequent portion of the content one specific rendering attribute at a time and specifies an adjustment level to which each of the specific rendering attributes is to be adjusted. The content with the adjusted selective attributes is forwarded to the HMD of the user 100 for rendering so as to enable the user to interact with the adjusted subsequent content without experiencing eye strain.

Figure 3:
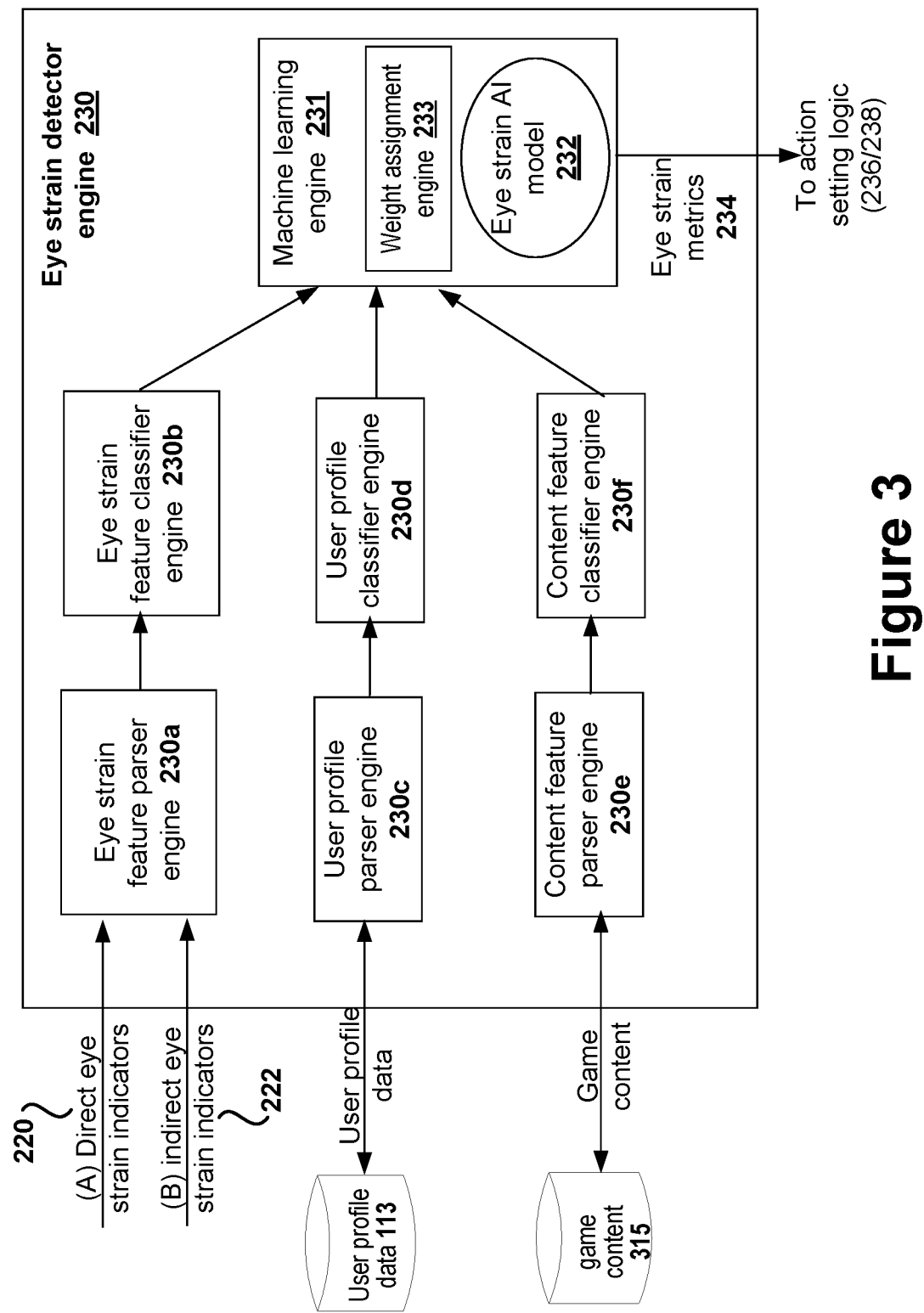
FIG. 3 illustrates a simplified block diagram of an eye strain detector engine that engages machine learning engine to identify eye strain metrics of content generated by an interactive application (e.g., video game) for identifying an action to perform at the video game to reduce eye strain of the user, in accordance with an implementation.

FIG. 3 illustrates the various components of an eye strain detector engine 230 used in processing the eye strain indicators collected by the various sensors and computing the eye strain metrics 234 for a user interacting with content of an interactive application, in one embodiment. In some embodiments, the eye strain detector engine 230 can be a software module that is executed by a processor of a computer. The term "engine" as used in the eye strain detector engine 230, in some embodiments, refers to a program or piece of code that is configured to perform certain function. The program or code may use deep learning algorithm to process certain ones of the data and to compute other data. In the case of the eye strain detector engine 230, the program is configured to receive the data from various sources, such as the eye strain indicators from the various sensors, user profile data from the user and from user profile datastore 113, and game content from a video game, parse the different data to identify the types of data included therein, and classify the data. In some embodiments, the software program is part of an operating system of the computer so that images captured by the sensors and image capturing devices can be processed at the operating system level and corrective action (240) identified for adjusting rendering attributes of the content. This avoids requiring each interactive application providing content to be updated to incorporate the eye strain detector engine 230 to process the captured images and to identify the necessary action 240 to be taken. In alternate embodiments, the eye strain detector engine 230 can be built into the hardware of the computer. The hardware component can assist in interacting with the sensors to receive and process the captured images and to identify appropriate action 240 for forwarding to individual interactive applications to adjust the rendering attributes of the content provided for rendering at the HMD.

In some embodiments, the eye strain detector engine 230 can be a software program that is used to collect the images of the eyes and other facial features of the user captured by the sensors and forward to the interactive application executing on the computer (e.g., a local computer, such as a game console, or a remote computer, such as a cloud server) via an application programming interface (API), for further processing. The interactive application can be a video game application providing game content. The processing of the data collected from the sensors, computing of the eye strain metrics 234 of the user, and identifying an action 240 to be performed to the content can be done at the video game level. Irrespective of the way the eye strain detector engine 230 is defined (i.e., as a software component or a hardware component or may be a firmware), the eye strain detector engine 230 is configured to receive and process the images of the eye features and other facial features of the user captured by a plurality of sensors and image capturing devices located in the physical environment where the user is operating and compute eye strain metrics 234.

The eye strain detector engine 230 includes a plurality of components that are used to process the data collected by the sensors, the user profile data, the game content provided by the video game (i.e., an interactive application). A machine learning engine is used to build and train an eye strain artificial intelligence (AI) model to compute the eye strain metrics 234. The eye strain metrics 234 are then forwarded to an action setting logic (236/238) to identify an appropriate action 240 to take to adjust the content. The eye strain detector engine 230 includes components to process the eye strain indicators, components to process the user profile data, components to process the game content, a machine learning engine with an eye strain AI model 232 to process the classified data from the various components and identify the eye strain metrics 234 as output. The components for processing the eye strain indicators include eye strain feature parser engine 230a and eye strain feature classifier engine 230b. The components for processing the user profile data include the user profile parser engine 230c and user profile classifier engine 230d. The components for processing game content include content feature parser engine 230e and content feature classifier engine 230f. The machine learning engine 231 includes a weight assignment engine 233 and the eye strain AI model 232.

A user may log into a computer to request access to game content of a video game. When the user logs in, the user is validated using the user profile data stored in a user profile datastore 113. The user profile data for the user includes the user identification information as well as device preferences, user customizations, user visual and/or aural characteristics, physical disabilities or challenges, content preferences, type of content available/accessible to the user, etc. The user validation is done by matching input credentials provided by the user during their login to the computer (e.g., game console or computer available locally or remote cloud server) against the corresponding credentials of the user stored in the user profile data. Once the user is successfully validated for the video game requested by the user, access to the video game and to the game content is provided to the user. The details included in the user profile data are used to not only validate the user but also to customize the content for the user.

When the user selects the video game (i.e., interactive application) to interact with, the video game is executed at the computer (either local or remote) and game content of the video game is forwarded to the HMD for rendering. The selection of the video game may be made through controls provided on the HMD, controls provided on a controller, or controls provided on other input devices operated by the user. The video game can be played in substantial real-time or can be a pre-recorded event and the game content of the video game from the live event or from the pre-recorded event is streamed to the HMD for rendering. In the case of the live event, the input is provided by the user using the controls on the HMD, the controls on the controller or controls on any other input device or via input interfaces. In the case of the pre-recorded event, the game content stored in the game content datastore 315 is retrieved and streamed to the HMD.

The user profile parser engine 230c parses the profile data provided by the user during initial login and the additional data included in the user profile of the user to identify different types of data and the user profile classifier engine 230d classifies the different types of data. For example, the user profile data of the user includes data pertaining to user identifier, content preference, device preference, user customization, user physical characteristics, user physical disabilities, etc., and the user profile classifier engine 230d classifies the data accordingly. The physical characteristics and physical disabilities of the user can be used to establish the tolerance level of the user to different rendering attributes used for presenting the content to the user and to customize the content. The classified user profile data is forwarded to machine learning engine 231 as input for further processing.

In one example, in response to the user's selection of the video game, the video game can be executed at the computer (either local or remote) and game content of the video game forwarded to the HMD for rendering. The selection of the video game may be made through controls provided on the HMD, controls provided on a controller, or controls provided on other input devices operated by the user. In this example, the video game is played in substantial real-time and the game state updated using game inputs provided by the user using controls of the HMD or the controller or other input devices, or via input interfaces. The game content generated for the updated game state is streamed to the HMD of the user for rendering. In another example, the user selection of the video game can be to view a pre-recorded gameplay. In this example, the game content stored in the game content datastore 315 is retrieved and streamed to the HMD.

The content feature parser engine 230e is used to parse the game content that is provided for rendering to the HMD to identify the different attributes of game content included therein (type of game presented, game objects, game scenes, game speed, game challenges, game characters, game tools, etc.), the rendering attributes used for presenting the content, etc. The parsed attributes are then classified using the content feature classifier engine 230f and the classified game content is forwarded to the machine learning engine 231 as input for further processing.

The game content selected by the user is forwarded to the HMD for user interaction. While the user is interacting with the content, various sensors and image capturing devices disposed in the physical environment of the user are activated to capture direct eye strain indicators 220 of the user. The direct eye strain indicators 220 are determined by evaluating changes in the eye features (e.g., changes in the pupil size, shape, redness factor, etc.) captured in the images of the eyes as the user is interacting with the content. The changes are evaluated by comparing the eye features captured in the images when the user was interacting with the content against the images used for establishing the baseline level for the user, wherein the baseline level of the user was established using the images of the eye features and other facial features of the user captured when the user was not wearing the HMD and was not interacting with any content. In alternate embodiments, the baseline level is provided as input by the user or obtained by other means or from other sources. The baseline level of the facial features of the user can be stored in their user profile within the user profile datastore 113 and retrieved for comparison as and when needed. The direct eye strain indicators 220 are used to derive indirect eye strain indicators 222. The direct eye strain indicators 220 captured by the sensors can include changes to the shape of the eyes of the user. From the changes to the shape of the eyes of the user (i.e., direct eye strain indicator), it can be determined if the user is squinting, closing their eyes, or opening their eyes wide (i.e., determining indirect eye strain indicators 222). The user's squinting, for example, can mean that the content is being displayed too brightly or at a distance that is hard for the user to comprehend. The images captured by the sensors are processed at the HMD or at the computer to determine the direct and the indirect eye strain indicators 222.

In addition to the eye features, the sensors are also configured to capture the images of the other facial features of the user, images of the wearable device (e.g., HMD) used for rendering content, images of interactive devices used for providing inputs, objects disposed in the physical environment, etc. The images of the other facial features, the HMD, interactive devices and of the physical environment are used by the HMD or the computer to further validate the changes in the eye features captured by the sensors. The images of the HMD and the input devices can be captured by tracking embedded sensors and visual indicators disposed on the outer surfaces of the respective devices using outward facing camera(s) of the HMD and cameras disposed in the physical environment outside of the HMD. The data and images collected from the embedded sensors, outward facing and external image capturing devices are used to determine the position, location, and orientation of the HMD from which the relative location of the user's head and that of the user in the physical environment can be determined. Details of the eyes and various other facial features are captured using internal facing cameras located on the inside surface of the HMD and oriented toward the eyes and other facial features of the user. The various sensors and image capturing devices can be configured to capture the images periodically during the time the user is interacting with the game content.

The direct and indirect eye strain indicators 222 are parsed by the eye strain feature parser engine 230a to identify the different types of eye strain indicators (e.g., changes to the shape of the eyes, blink pattern, etc.,) and details of the eye strain indicators (e.g., extent of such changes) included therein. The parsed eye strain indicators data are classified using the eye strain feature classifier engine 230b. The classified eye strain data is forwarded as input to the machine learning engine 231 for further processing.

The machine learning engine 231 uses the inputs provided by the various classifier engines and processes the inputs. For example, the machine learning engine 231 can evaluate the changes detected in each eye feature and determine the extent of the changes and the extent of time such changes last. Based on the evaluation, the machine learning engine 231 can determine if the changes to a particular eye feature is to be considered as a potential contributing factor for causing eye strain in the user.

To determine if changes to a certain eye feature is to be considered as a potential contributing factor, the machine learning engine 231 examines each of the trackable eye feature in the context of the user's tolerance/sensitivity level either specified by the user or included in the user profile data, to determine if changes to a particular eye feature needs to be monitored for the user more closely. Once the eye features of the user have been examined, the machine learning engine 231 then establishes a predefined level of change that has to be observed in each eye feature to consider the change observed in the eye feature is a concern for the user and to identify a corrective action 240 that needs to be taken when presenting the content. As the sensitivity or tolerance level can vary from one user to another, the predefined level established for the eye feature can be user-specific. Further, the predefined level can also be content-specific, based on the type of video game providing the game content (e.g., high-intensity game or low-intensity game).

The machine learning engine 231 examines the classified eye strain indicators collected during the rendering of a portion of the game content to determine if the changes detected in a particular eye feature captured during the rendering of the portion exceeds the predefined level specified for that eye feature, is varying over time, remains the same, or the changes are insignificant. The eye strain indicators can vary from one portion to another and such variation can be attributed to different rendering attributes used for presenting the game content in the respective portion. Therefore, if the changes in the particular eye feature observed in the portion exceed the predefined level or is varying over time, the machine learning engine 231 flags the particular eye strain indicator as a potential contributing factor for causing eye strain for the user. In some embodiments, the changes in the particular eye feature can be further validated by evaluating the changes in the other facial features, wherein changes to the other facial features can indicate change in expression that correlates with the changes in the eye feature. In some embodiments, the eye strain indicators identified as potential contributing factors can be further validated using eye strain indicators of other users captured during the respective other users' interaction with the portion of the content for which the eye strain indicators were examined for the user.

In some embodiments, the sensors capture the observed features, such as shape of the eye, size of the pupil, blink rate, location of the pupil, movement of the eyes, speed of movement, gaze direction, redness factor, etc. The images of the observed features captured over time are evaluated by the machine learning engine 231 to detect changes in the respective observed features (i.e., eye strain indicators). Based on the evaluation, the machine learning engine 231 determines that one or more eye strain indicators are potential contributors to the eye strain of the user. For example, an increase in the size of the pupil can be a potential contributing factor to cause eye strain of the user, if the size of the pupil has increased by at least a predefined amount and such increase has lasted for at least a predefined period of time or is varying in size over time as the user is interacting with the content. The changes in the eye feature can be due to the way the content is being presented to the user. For example, an increase in the size of the pupil can be due to the game content being presented with insufficient light. Similarly, a decrease in the size of the pupil can be due to the content being presented with too much light. In the above example, the size of the pupil is shown to be influenced by the rendering attributes of the content. The changes in the various eye features, such as the shape, redness factor, blink pattern, pupil size, etc., can be monitored and examined to determine the changes in each of the eye features. The changes in the eye features, as noted above, can be influenced by the rendering attributes of the content.

As part of analyzing the changes in the eye features observed in the user as the user is interacting with the content, in some embodiments, the machine learning engine 231 can perform further validation of the changes in the eye features observed in the user. For example, the machine learning engine 231 can use the reactions provided by other users who interacted with the portion of the content to determine if the changes in the eye features detected in the user for the portion of the content were also detected in other users. The machine learning engine 231 examines the changes in the eye features of the user in the context of the game content included in the portion to determine a correlation between the changes detected in the one or more eye features of the user and the one or more of the rendering attributes of the game content. For example, during the user's interaction with a particular portion of the content, if the changes detected in the pupil size of the user exceeded a predefined limit, the rendering attributes of the content in the particular portion are examined to determine if the rendering attributes used for presenting the content in the particular portion could have caused such changes. It is well known that when content is presented too brightly, the natural instinct for the eyes is to narrow (i.e., reduction in the size of the pupils) to reduce the amount of light that passes through. Similarly, when the content is presented too dimly, then the pupil size is increased to allow more light to pass through. Based on the examination of the rendering attributes of the content and the increase in the pupil size, the machine learning engine 231 can correlate the increase in the pupil size to the content being presented brightly. The machine learning engine 231 can further examine the content and the context to determine if the changes detected in the pupil size was momentary or lasted for a longer period of time. The momentary change could be due to a flash of light included in the content, for example. If the changes in the size of the pupil lasted for a brief period then the machine learning engine 231 will ignore the changes in the pupil size. If, however, the increase in the size of the pupil lasted for a longer period of time, then the machine learning engine 231 examines the context and rendering attributes of the content to determine if the changes were due to changes in the rendering attributes (content being presented too brightly), or due to eye fatigue experienced by the user. Eye fatigue could be a result of the user interacting with the content presented at the HMD for a longer period of time. The machine learning engine 231 thus takes into consideration all the inputs provided by the various classifiers to correlate the changes in the eye feature detected in the user with the changes detected in other users and with the content, and to associate the changes with specific ones of the rendering attributes used to present the portion of the content. The machine learning engine 231 can use the deep learning from examining the various content presented to the users and the reactions of the users to establish the changes in the eye feature of the user is appropriate for the content and is user-specific or content-specific.

The above example showed a simple correlation between a single eye strain indicator and a certain rendering attribute. However, there can be more than one eye strain indicator that can be influenced by one or more rendering attributes used for presenting the game content. To get a better perspective of the influence each rendering attribute exerts on the eye strain indicators, the machine learning engine 231 builds and trains an eye strain AI model (or simply referenced henceforth as "AI model") 232. The AI model 232 is built and trained using rendering attributes of the media content and the eye and other facial features of the user captured by the various sensors. For instance, the attributes of the media content and the observable features of the user (e.g., eye features, such as blink rate, pupil size, shape of eyes, gaze direction, motion, direction of motion, etc., and other facial features, such as location, direction, orientation of the head, nose, mouth, etc., of the user, motion and direction of motion of the different facial features, etc.) are used to define a matrix of criteria, wherein each element of the matrix is defined by a criterion involving one or more eye strain indicators, wherein each strain indicator captures changes in the one or more eye features and/or one or more other facial features that are influenced by one or more rendering attributes used for presenting the game content. In addition to the observable features and attributes of content, each criterion can also be defined as a function of time in order to account for the influence of time of interaction on the observable features (e.g., eye and other facial features) of the user. The time factor used to define each criterion takes into consideration not only the influence of interaction time on the observable eye and facial features of the user but also the amount of time certain rendering attributes were in effect in the portion of the content. In some embodiments, the variables in each node representing the respective criterion are defined in a Boolean format. The AI model 232 is built to include a plurality of layers of inter-connecting nodes, with the node in each successive layer further fine-tuning the criteria included in the one or more nodes of the previous layer.

The machine learning engine 231 engages a weight assignment engine 233 to assign a weight for each eye feature included in each criterion, wherein the assigned weight corresponds with the extent of influence the changes observed in the respective eye feature included in each criterion has in causing the eye strain of the user. In some embodiments, the weight assignment engine assigns a distinct weight for each eye feature. In other embodiments, the weight assignment engine assigns a same weight for two or more eye features of the user that is associated with a corresponding eye strain indicator. In some embodiment, the changes in a particular eye feature may be considered insignificant by itself, but the changes observed in the particular eye feature can be significant when considered with changes observed in other eye features, as the combined changes, even when insignificant individually, can still contribute to the overall eye strain for the user. In some embodiments, the amount of influence of each eye feature in determining the overall eye strain of the user can depend on the vision characteristics of the user. For example, the user may be more sensitive to brighter light than to dim light or to average speed than high speed with which the content is rendered and the eye strain indicator observed from the eye and other facial features of the user can reflect this when the user is interacting with the game content (i.e., the assigned weight is based on a level of influence each eye feature has on the eye strain). In some embodiments, as more than one eye strain indicator can be a contributing factor for causing the eye strain for the user, certain ones of the criteria in the matrix used to build the AI model 232 are defined to include more than one eye strain indicators (i.e., changes to more than one eye feature) while certain other ones of the criteria in the matrix are defined to include just a single eye strain indicator. The weight(s) assigned to each eye feature used for defining each criterion in the matrix is used to compute a composite value for the criterion, wherein the composite value is a consolidation of the weights assigned to each eye feature defining the respective criterion. The composite value computed for each criterion is associated with the respective element in the matrix and quantifies the effect of the eye feature variables defining the criterion on the eyes of the user. The composite value, in some embodiments, defines a relative influence the criterion (i.e., the specific eye strain indicators defining the criterion) has in causing the eye strain for the user over the other criteria in the matrix. Each of the criterion is monitored and when any of the eye strain indicators included in the criterion exceeds or is close to exceeding a predefined limit (i.e., level or value), an indicator is set to indicate as such to the eye strain detector engine 230. In some embodiments, the indicator can be a flag set to correspond with the node in the AI model 232 that is associated with the element of the matrix. In some embodiments, the flag is defined as a binary number. In addition to the indicator, the composite value associated with the node, the weight assigned to each eye feature and an extent to which one or more of the eye features defining the criterion of the node exceeded the predefined limit can also be defined for the node.

As more and more sensor data capturing observable features is collected, the AI model 232 is refined to include the captured sensor data. The machine learning engine 231 uses the trained AI model 232 to identify an output that corresponds with the specific set of eye features expressed by the user and for the type of rendering attributes used for rendering the current portion of the content for the user. Where the rendering attributes are not included in the criteria, the machine learning engine 231 analyzes the eye strain indicators identified from the eye features included in the criterion/criteria and examines the current content to determine the relevant rendering attributes used for presenting the current content. The output identified from the AI model 232 is forwarded by the machine learning engine 231 to an action setting logic (236/238).

In some embodiments, the output forwarded to the action setting logic (236/238) includes the criterion/criteria that triggered setting of the indicator. In some other embodiments, in addition to the criterion, the indicator that was set to flag the criterion is also forwarded to the action setting logic (236/238). The action setting logic (236/238) uses the criterion as well as the indicator, where available, to identify an action 240 that can be taken by the video game to reduce or prevent the eye strain in the user. The action 240 identifies specific one or more of the rendering attributes and the amount by which the specific one or more of the rendering attributes have to be adjusted for subsequent content following the current content prior to forwarding the subsequent content to the HMD for rendering, so that the adjusted subsequent content can reduce or prevent the eye strain for the user. The specific one(s) of the rendering attributes for adjustment are identified by analyzing the current game content presented to the user. The action 240 to adjust specific ones of the rendering attributes is identified upon determining that the subsequent portion of the game content includes the specific ones of the rendering attributes.

In some embodiments, the action 240 includes a command providing instructions to adjust the content in a specific way. One of the actions specified is to pause the video game so that the user can take a break from the content. Another action could be to adjust section(s) of the subsequent portion of the content identified for foveated rendering. In the case of adjusting rendering attributes, the action 240 includes a command that identifies specific ones of the rendering attributes that need to be adjusted for the subsequent portion of the video game and the amount of adjustment that needs to be done for each identified rendering attribute. In some embodiments, the command also provides instructions to adjust the specific ones of the rendering attributes one rendering attribute at a time. Thus, the machine learning engine 231 computes the eye strain metrics 234 by monitoring the changes in the eye features and examining the changes in the context of the game content that corresponds with the changes in the eye features of the user. The computed eye strain metrics 234 are specific for the user as the computation takes into consideration the visual characteristics and sensitivities of the user.

As noted, the output identified by the machine learning engine 231 is forwarded by the eye strain detector engine 230 to an action setting logic. In the case where the eye strain detector engine 230 is part of the operating system, the action setting logic (238) may be also part of the operating system. In the case where the eye strain detector engine 230 is part of the interactive application, such as the video game application, the action setting logic (236) may be part of the video game logic 300. Alternately, the action setting logic can be included in the firmware or embedded in another application (e.g., a widget) that has access to the game content of the video game application prior to the adjusted game content being forwarded to the HMD of the user for rendering. The output identified by the machine learning engine 231, in some embodiments, includes the eye strain metrics 234 (identifying eye strain indicators, composite value, flagged indicators, etc.,) and identifiers of certain ones of the rendering attributes that need to be adjusted in the game content. In some other embodiments, the output identified by the machine learning engine 231 includes the eye strain metrics 234. In such embodiments, the action setting logic (236/238) is configured to interpret the command, identify the rendering attributes that are used to present the current content rendered at the HMD, identify the certain ones of the rendering attributes that need to be adjusted, ensure that the certain ones of the rendering attributes that need adjustment are also included in the subsequent portion of the content, (if the rendering attributes are not identified) a level to which each of the certain ones of the rendering attributes need to be adjusted in the subsequent portion to identify an action 240 that is to be forwarded to the video game for adjusting rendering attributes of the subsequent portion.

The video game providing game content to the HMD of the user can be an action game where the subsequent portion of the video game can be dynamically determined based on the current state of the video game and the inputs provided by the user in the current portion of the video game. In such cases, the machine learning engine 231 can predict the subsequent portion of the video game that is identified for rendering following the rendering of the current portion by analyzing the game state and the inputs of the user and by querying the game logic 300 of the video game. Once identified, the subsequent portion that is predicted to occur in the video game is examined by querying game logic 300 of the video game to determine the rendering attributes that are included for rendering the subsequent portion of the game content that is predicted to occur following the current portion. Using the game content included in the subsequent portion, the machine learning engine 231 predicts eye strain indicators that are likely to be exhibited by the user during their interaction with the subsequent portion. The prediction of the eye strain indicators is based on the eye strain indicators that have been detected from the user during the user's interaction with the current portion of the game content and from the rendering attributes that are included in the predicted subsequent portion. The machine learning engine 231 computes the eye strain metrics 234 for the subsequent portion of the game content and uses the computed eye strain metrics 234 to identify the appropriate action 240 that needs to be taken to assist the user in interacting with the game content without experiencing eye strain and motion sickness, which are common problems experienced by the user during extended use of the HMD for viewing and/or interacting with content.

It is to be noted that the eye strain indicators can vary over time (e.g., blink rate or dryness or redness factor can vary as the user interacts with the content over an extended period of time) and from one user to another. The eye strain detector engine 230 computes the eye strain metrics 234 for each user by calibrating baseline level for each eye strain indicator that can be identified for each user. The baseline measure is established initially via active calibration by performing tests capturing eye features of the user prior to the user interacting with the content. Using the captured eye features, a baseline level of the eye strain indicators can be established for each user. As the user engages in interacting with content of an interactive application (such as game content of the video game), the eye strain indicators are captured periodically during the user's interaction with the game content and compared against the baseline level determined for each user to calibrate the eye strain. The calibration of the eye strain for the user is user-specific as it is computed based on the user's vision characteristics, and the user's preferences and customizations of the game content. Further, the calibration takes into consideration the weight assigned to each eye strain indicator, wherein the assigned weight is adjusted to reflect the time when the eye strain indicator was detected and the amount of time the user was engaged in interacting with the content.

In some embodiments, the action 240 identified by the action setting logic (236/238) is forwarded to the video game with instructions to execute the command included therein upon receipt. The command specifies which one(s) of the rendering attributes of the subsequent game content generated by the video game to adjust. In some other embodiments, instead of the forwarding the action 240 to the video game, the action 240 can be forwarded to an encoder/decoder module (CODEC) (not shown) that receives the game content of the video game for encoding and transmitting. The action 240 to the CODEC includes instructions to execute the command upon receipt. In response, the CODEC executes the command by adjusting the rendering attributes of the subsequent portion of game content received from the video game prior to encoding and transmitting to the HMD for rendering. The adjusted game content when viewed by the user assists in reducing the eye strain.

FIGS. 4A-4C illustrate sample graphs generated by plotting variation of a single eye strain indicator over time, in some implementations. FIG. 4A illustrates a graph plotted by tracking and evaluating changes in pupil size of the user (i.e., an eye strain indicator) over time as they are interacting with game content. As shown in graph line A, the pupil size of the user has not may not varied much over time. Examining the various characteristics and attributes of the input data would show that the rendering attributes of the game content have not drastically changed over time, which correlates with minimal variation in the pupil size of the user observed in graph line A. FIG. 4B illustrates another example graph line generated by plotting variation in pupil size of the user captured over time as the user is interacting with the game content. As shown in graph line B, the pupil size has appeared to have noticeably varied in size for a brief period during the user's interaction with the game content and the variation is at least equal to predefined limit. Upon examination of the rendering attributes of the game content, it is observed that the brief spike in the pupil size correlates with a bright flash of light that occurred within the game content of the video game during the period when the spike of the pupil size was observed in the user. In this example, the variation is seen by the reduction in the pupil size of the user by at least the predefined level, wherein the predefined level is defined as a percentage or a dimensional measure. FIG. 4C illustrates yet another alternate graph wherein graph line C is plotted for the variation in pupil size over time. As shown in graph line C, the pupil size is shown to have steadily increased over time during the user's interaction with the game content. By examining the various characteristics and attributes of the input data it can be seen that the steady increase in pupil size is not due to any drastic changes in the rendering attributes of the game content. Upon further examination, it is determined that the steady increase is due to the user's extended period of interaction with the game content. In this example, the variation in the pupil size observed in the user was an increase in the pupil size that slowly and steadily increased over the period of time.

Figure 5A:
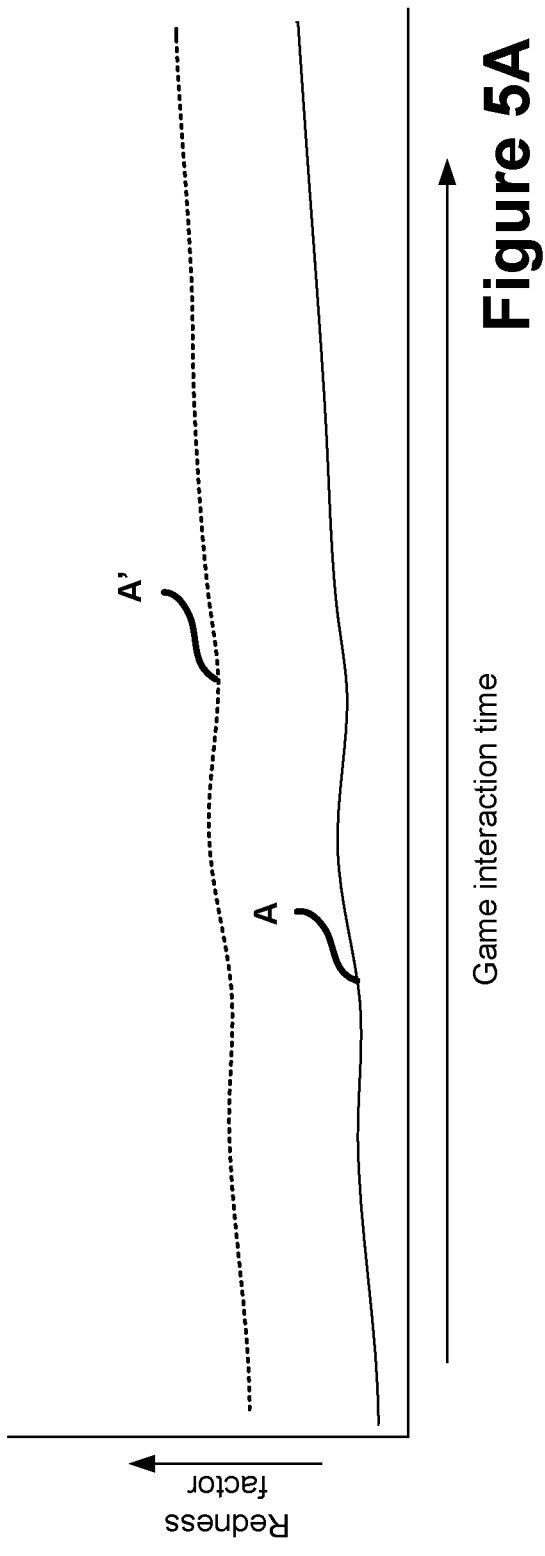
FIGS. 5A-5B illustrate sample graphs generated by plotting an eye strain metric (e.g., redness factor) for a specific rendering attribute (e.g., speed of rendering or brightness or resolution) against game interaction time and using the eye strain metric to identify an action to be performed at the video game to reduce the eye strain of the user, in accordance with one implementation.
Figure 5B:
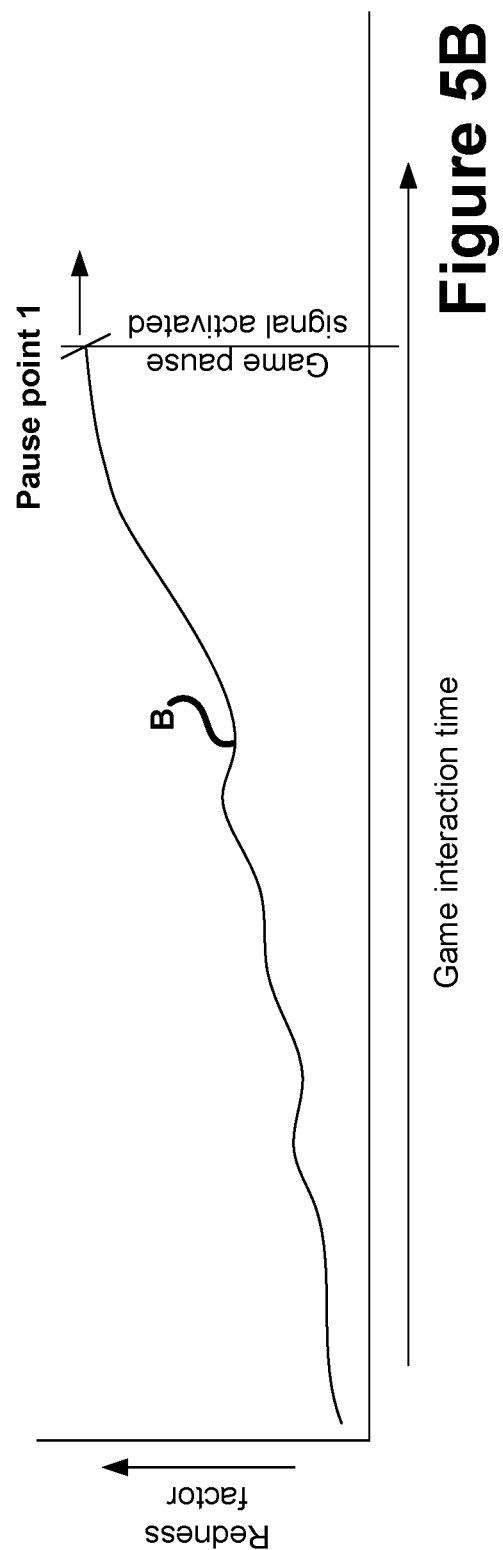

FIGS. 5A and 5B illustrate a sample set of graphs generated by plotting variation in an eye strain indicator (e.g., redness factor) of the user as the user is interacting with the game content of the video game. For example, graph line A represents a scenario where, at the beginning of gameplay, the eyes of the user are not exhibiting much redness but as the user continues to engage in gameplay, the redness factor is shown to steadily increase. Graph line A' represents a scenario where the user's eyes exhibit some level of redness at the beginning of gameplay, which slowly and steadily increases as the user continues to engage in gameplay. The redness factor (i.e., eye strain indicator) is continuously or periodically monitored during the course of gameplay of the video game by the user and the increase in the redness factor is periodically compared against a predefined threshold level. When the redness factor exceeds the predefined threshold level, an action 240 is identified and triggered. FIG. 5B illustrates one such scenario. As shown in graph line B in FIG. 5B, during monitoring of the eyes of the user, when it is detected that the increase in the redness factor either meets or exceeds the predefined threshold, an action 240 is identified by the action setting logic (236/238) of the eye strain detector engine 230 and is transmitted to the video game. The action 240 can be to pause the video game to allow the user to take a break from gameplay and allow their eyes to rest. This is shown in FIG. 5B as pause point 1. When the user wants to resume gameplay, the eye strain detector engine 230 identifies and initiates a second action to begin gameplay of the video game from the pause point onwards. It should be noted that the action identified can vary based on the eye strain indicator observed in the user and in the scenario shown in FIGS. 5A and 5B, the pause signal is shown to be appropriate to reduce the eye strain of the user. It is to be noted that the action that is identified is for performing on a subsequent portion of the game content of the video game and is identified by monitoring the eye strain indicators of the user leading up to a current portion of the game content.

FIGS. 6A and 6B illustrate yet another sample set of graphs generated by plotting variation in eye strain indicators during the user's interaction with a current portion of the video game and for identifying a corrective action that needs to be taken in a subsequent portion of the video game, in some example implementations. The graph lines illustrated in FIGS. 6A and 6B are plotted by taking into consideration variations in a single eye strain indicator or a plurality of eye strain indicators. As the user is engaged in gameplay, the eye strain indicators of the user are monitored for a current portion of the gameplay rendered at the HMD. In FIGS. 6A and 6B, the current portion is shown as broken rectangle "A". The eye strain detector engine 230 compares the eye strain indicators against predefined threshold level to see if anyone or a collection of the eye strain indicators have exceeded the predefined threshold level. If the eye strain indicators exceed the threshold level, then the eye strain detector engine 230 uses the machine learning engine 231 to identify an action that needs to be performed to reduce the eye strain for the user. If the eye strain indicators are within the threshold level, then the eye strain detector engine 230 continues to monitor the eye strain indicators of the user during the course of gameplay. In such cases, the eye strain detector engine 230 identifies and examines a subsequent portion of the game content to determine if the eye strain indicators are likely to exceed the predefined threshold level. In a high intensity video game packed with actions and various paths that the user can take during gameplay, predicting the subsequent portion can be useful in determining the level of eye strain on the user and for proactively identifying an action to perform within the video game to assist in reducing the eye strain of the user.

The eye strain detector engine 230 predicts the subsequent portion of the game content, shown as broken rectangle "B" in FIG. 6A, based on the current game state, current game context, and user inputs provided by the user in the current portion of the video game. The eye strain detector engine 230 can query the video game logic 300 to determine if the subsequent portion of the video game is designed to include game content that is likely to cause the eye strain in the user. Based on the determination of the type of game content included in the predicted subsequent portion, the eye strain detector engine 230 can predict the likelihood of the user experiencing eye strain. Based on such predicted outcome, the action setting logic (236/238) engaged by eye strain detector engine 230 identifies an action that can be taken within the video game to assist the user. The action can include instructions to adjust (i.e., reduce or enhance) one or more rendering attributes used for presenting the subsequent portion of the game content of the video game, pause the video game, etc., and to perform the action upon receipt. When more than one rendering attributes are identified for adjusting in the action, the action can include instructions to adjust one rendering attribute at a time. Further, the instructions can also specify the speed (e.g., gradual, abrupt, etc.) with which such adjustment needs to be done.

The identified action is forwarded to the video game to perform the action to correct (i.e., adjust) one or more of the rendering attributes upon determining that the predicted subsequent portion of the content is actually scheduled to occur, as shown by broken rectangle "B" in FIG. 6B. The video game, in response to receiving the action, performs the action by executing the instructions included therein. FIG. 6B illustrates one such example where the action is performed by the video game, as shown by broken rectangle 'C'. Based on the instructions, the video game adjusts the one or more rendering attributes of the game content generated for the subsequent portion of the video game, prior to forwarding to the HMD for rendering. The adjusted subsequent portion, when rendered at the HMD, aids in reducing the eye strain of the user, as shown by the broken section 'D' of the graph line illustrated in FIG. 6B.

Figure 7A:
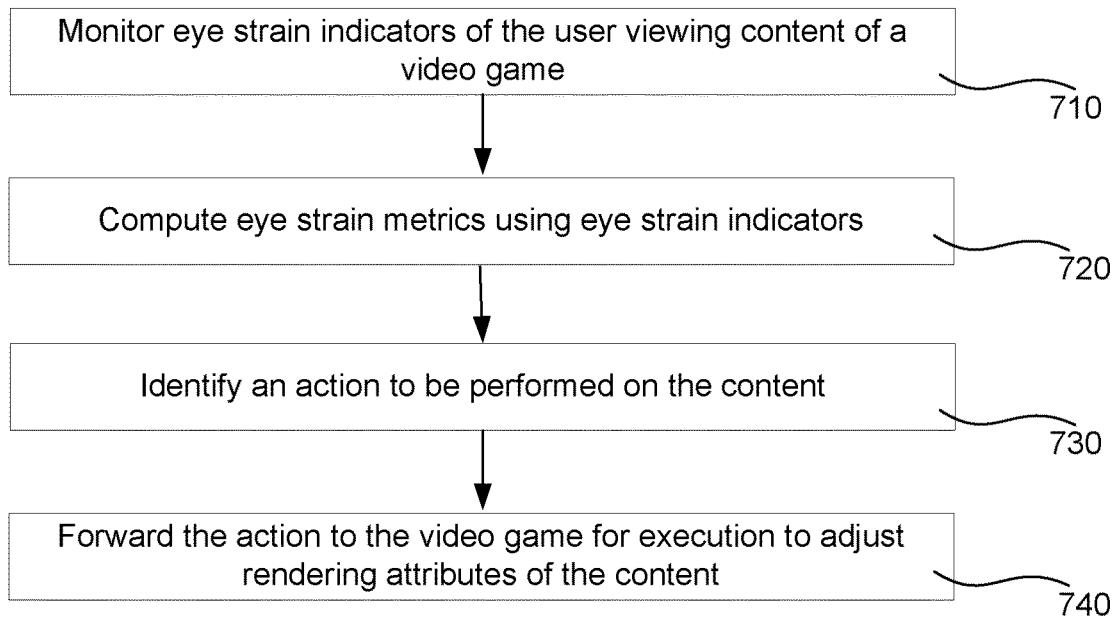
FIG. 7A illustrates flow of operations of a method for adjusting rendering attributes of content in order to reduce eye strain for a user during rendering of content, in accordance with one implementation.

FIG. 7A illustrates a flow of operations of a method used for reducing eye strain for a user as the user is interacting with the game content of the video game rendered at an HMD worn by the user, in one embodiment. The method begins at operation 710, wherein eye strain indicators of the user are monitored as the user is viewing/interacting with the game content of the video game. The eye strain indicators, in some embodiments, refer to changes observed in eye features and other facial features of the user that can potentially cause in eye strain of the user. The eye strain indicators include both direct eye strain indicators 220 (i.e., observed eye strain indicators captured by sensors) and indirect eye strain indicators 222 (i.e., derived from direct eye strain indicators 220). The eye strain indicators are then used to compute eye strain metrics, as illustrated in operation 720. The eye strain metrics are computed by comparing the eye strain indicators collected during the user's interaction in a current portion of the game content against a baseline level established for the user. The eye strain metrics is computed to define the level of eye strain that the user will potentially experience during their interaction with the game content.

Based on the computed eye strain metrics, an action to be performed on the game content is identified, as illustrated in operation 730. The action corresponds to the eye strain indicators that are identified to potentially cause eye strain in the user and includes instructions for performing the action to the game content generated for subsequent portion of the video game. The action identifies certain ones of the rendering attributes that need to be adjusted in the subsequent portion, a level to which the certain ones of the rendering attributes need to be adjusted, and the mode (e.g., gradual, abrupt, etc.,) in which such adjustments need to be carried out. The identified action is forwarded to the video game for execution, as illustrated in operation 740. The video game initiates the action and adjusts the certain ones of the rendering attributes in accordance to the instructions included with the action. The adjusted game content for the subsequent portion of the video game is transmitted to the HMD for rendering to the user.

Figure 7B:
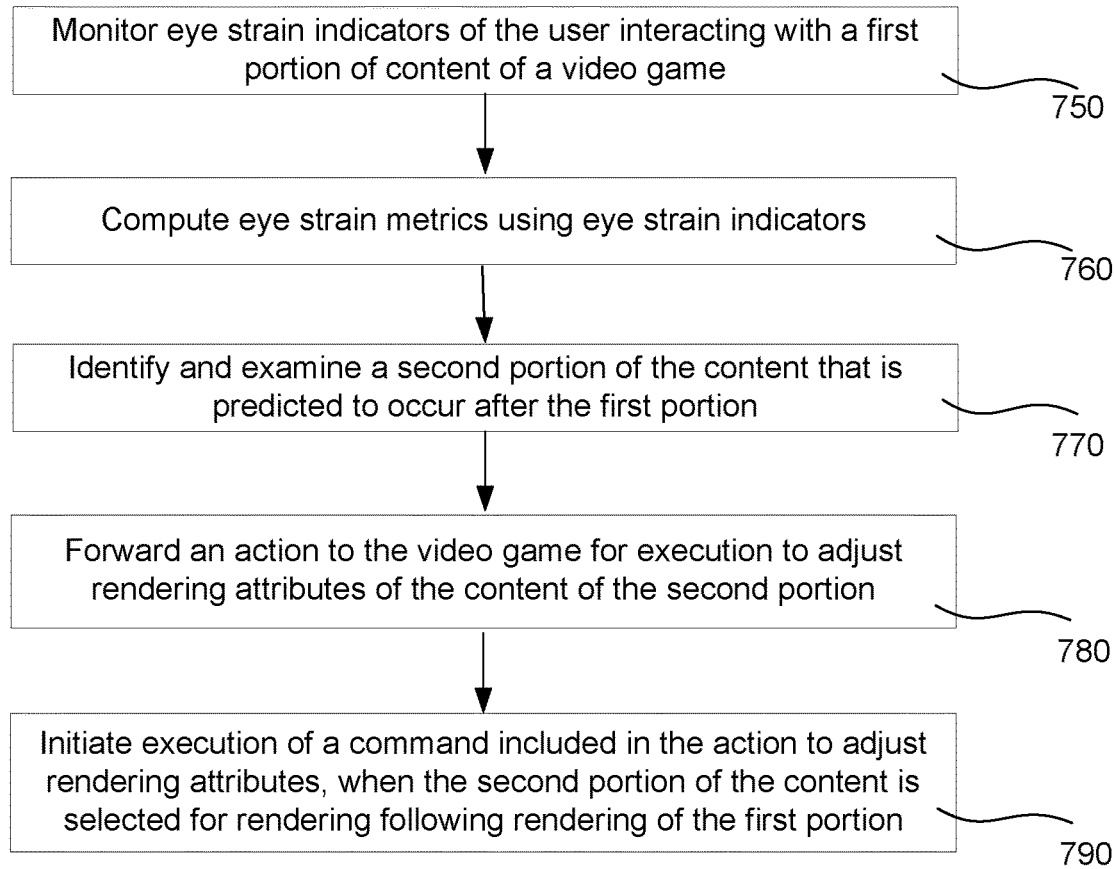
FIG. 7B illustrates flow of operations of an alternate method for adjusting rendering attributes of content in order to reduce eye strain for a user during rendering of content, in accordance with an alternate implementation.

FIG. 7B illustrates flow of operations of a method for reducing eye strain for a user wearing an HMD and interacting with the game content rendered on the display screen, during game play of the video game, in an alternate embodiment. The method begins at operation 750, wherein eye strain indicators of the user are monitored while the user is interacting with a first portion of game content. The eye strain indicators are monitored using images captured by sensors (e.g., image capturing devices, IMU sensors, etc.). The captured eye strain indicators are used to compute eye strain metrics, as illustrated in operation 760, wherein the eye strain metrics can indicate a level of eye strain that is currently experienced by the user.

The method proceeds to operation 770, wherein a second portion of the video game that is predicted to occur following the current portion, is identified and examined. As noted, in a high intensity game with lot of actions and paths that can be used by the user to progress in the video game, the user can take any one of the number of paths. In order to proactively take corrective actions to ease the eye strain in the user, the eye strain detector engine 230 predictively determines the second portion that is likely to occur in the video game by analyzing the first portion of the game content currently rendering at the HMD, the game inputs provided by the user, and the game context of the first portion. The eye strain detector engine 230 then queries the video game logic 300 to identify the type of actions and challenges that are contained in the second portion and the likely game content that can be included in the second portion of the video game. The eye strain detector engine 230 then examines the game content that is likely to be included in the second portion to determine the rendering characteristics that will be used in presenting the second portion of the game content to the user. Based on the computed eye strain metrics and the rendering characteristics that are likely to be used in the second portion, an action is identified that corresponds with the rendering characteristics used in the first portion and the rendering characteristics that are defined to be included in the second portion. The identified action includes instructions to adjust certain ones of the rendering attributes that the eye strain detector engine 230 determines are likely to cause eye strain to the user and a command with instructions to execute the action upon receipt, in some embodiments. The identified action is forwarded to the video game, as illustrated in operation 780. The video game, in response to receiving the action, initiates execution of the command and adjusts the certain ones of the rendering attributes identified in the command and used for rendering the game content included in the second portion, as illustrated in operation 790. The adjustment of the rendering attributes is upon verification that the certain ones of the rendering attributes identified for adjusting is indeed included in the second portion and that the second portion is scheduled to occur following the first portion. The adjusted game content of the second portion is forwarded to the HMD for rendering. The adjusted game content reduces the strain on the user thereby assisting the user in interacting with the game content without undue strain.

To summarize, the various embodiments have been discussed wherein the rendering attributes or other actions are dynamically adapted for subsequent portion of the game content based on the eye features and rendering attributes detected in a current portion. The eye strain detector engine 230 is part of an operating system of a computer or is part of the video game. The eye features (e.g., blink rate, pupil size, shape of the eye (e.g., squinting), etc.,) that are influenced by the rendering attributes are used to define the matrix of criteria, wherein each criterion is defined to include a Boolean value of one or more eye features. The criteria are monitored and when a certain criterion exceeds a predefined amount or level, a flag is raised to signal the video game that an adjustment needs to be made to one or more rendering attributes. Along with the flag, the details of the criterion that raised the flag and the amount by which select ones of the eye strain indicators (i.e., changes to eye features) included in the criterion exceeded the predefined level, are also shared with the video game. For example, if the blink rate goes above a certain level (e.g., >10% or 15%) and/or the pupil size increases or decreases by a certain amount (e.g., >10% or 15%), then the flag can be raised to the video game. In some embodiments, the flag can be raised to indicate to the video game that a certain eye strain metric is at an elevated level (e.g., rendering attributes, such as brightness, speed, resolution, etc.,) or needs to be adjusted (e.g., foveated region) or provide suggestions (e.g., instruct the user to take a break) to the user so as to reduce eye strain or to address the eye strain experienced by the user. In some embodiments, the suggestions are provided in a pop-up window. In some embodiments where the video game is a multi-player game, in addition to providing suggestions to the user, the video game can also provide additional warning or informational message to other users who are playing the video game with the user. For example, if the suggestion to the user is to take a break, then the video game can also provide an informational message to other users stating that the user is currently taking a break. In some embodiments, the suggestion or the warning/informational message may be provided with a count-down timer, wherein the count-down timer is used to determine when the gameplay of the video game is to be resumed. Additional warning or informational messages may be provided to the user and other users to let the user know when to get ready to resume gameplay and to state to the other users that the user is ready for gameplay after the break.

The flag is forwarded to the video game, wherein the flag can include an action or can be interpreted to identify an action that is to be performed at the video game. For instance, the eye strain detector engine 230 can specify the action to be performed within the video game. In another instance, the eye strain detector engine 230 forwards the flag to the video game and the video game can interpret the information included in the flag to identify the action that needs to be performed at the video game. The action is specified or identified to perform adjustment in the video game in order to lower the eye strain metric. For example, the action can specify or be interpreted to pause the video game or adjust portions selected for foveated rendering or adjust one or more rendering attributes within the portion of the game content or instruct the video game to perform other activity in order to lower the flag.

The various embodiments are not restricted to adjusting the rendering attributes of the game content for the video game. In some embodiments, instead of or in addition to adjusting the rendering attributes of game content, the rendering attributes of a user interface used to provide game inputs by the user may also be adjusted to assist the user in providing game inputs without any physiological strain. For example, a toolbar for interacting with the game content may always be rendered on the right but the user may have to strain themselves to see and/or interact with the toolbar rendered on the right. Thus, to assist the user to provide game inputs without any physiological strain (e.g., strain of the shoulder, neck, head, or eyes), the user interface can be defined as an adaptive user interface, wherein the user interface can be shifted to different sections of the display screen, based on user preference or ease of use, so as to assist the user by avoiding unnecessary physiological strain.

As stated previously, the eye strain indicators are influenced by time. For example, the change in blink rate of the user who used the HMD to interact with the video game can be more significant when the user is engrossed in the VR for an extended period (e.g., 5 hours) than for a brief period (e.g., 5 minutes). Similarly, fall of strength of the user can be detected from the user's lack of being able to do certain functions that they normally do correctly and such faltering in strength can occur due to the user engrossed in the game content for an extended period of time, and can signify eye strain or other physiological strain in the user. Based on the type of eye strain experienced by the user, an appropriate command is generated and included in the action or the flag forwarded to the video game, which determines the type of action to perform to reduce the eye strain and/or other physiological strain experienced by the user. The action can be performed on the game content or on the display settings specified for the interactive tool rendered on the screen of the HMD and used for providing game inputs to the video game. The action setting logic (236/238) integrated in the operating system or the video game uses the various metrics obtained from the user that are time based, user based, content based, etc., to identify an appropriate action to perform to allow the user to interact with the content rendered at the HMD without experiencing physiological strain.

Figure 8A:
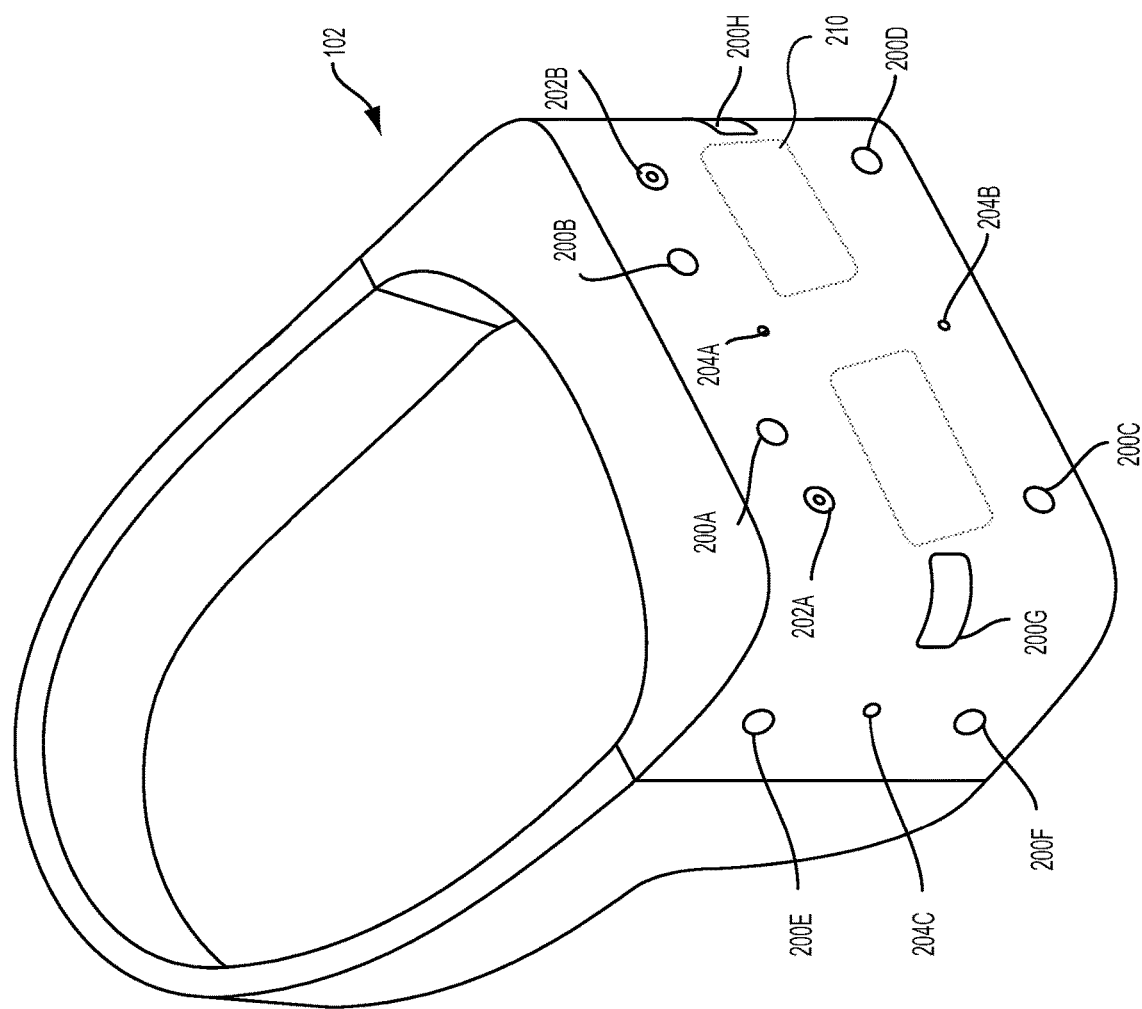
FIG. 8A illustrates various sensors and visual indicators disposed on a wearable device that is used to collect eye gestures data of the user as the user is interacting with content, in accordance with one implementation.

FIG. 8A illustrates an example implementation of a HMD 102 with a view of the external side of the HMD 102. The HMD 102 may or may not be configured to have see-through capability. As illustrated, the HMD 102 includes a pair of lens 210 (i.e., part of the optics), with each lens of the pair being oriented in front of each eye of the user, when the user is wearing the HMD 102. In an alternate implementation, the lens may be provided in front of one eye of the user, instead of both the eyes of the user. The HMD 102 illustrated in FIG. 6A is configured to render virtual reality environment. The HMD 102 can also be configured to render augmented reality environment, wherein the display screen is configured to have a see-through capability into the real-world in the vicinity of the user. In such implementations, the lens 210 is configured to allow the user to view the real-world objects as well as the virtual elements that are overlaid over some of the real-world objects. The pair of lens 210 may be configured to adjust the image of the virtual elements and the view of the real-world objects in accordance to vision characteristics of the user.

The HMD 102 includes a frame. The frame provides a housing for some of the components of the HMD 102, such as the Inertial Measure Unit (IMU) sensors, plurality of lights, microphones, image capturing devices that are used in the functioning of the HMD 102, memory and a processor that is communicatively connected to a computer 106. The HMD includes communication capabilities to access and interact with the computer 106. Additionally, the HMD 102 can be communicatively connected to the network 110 using wired, wireless, or 3G/4G/5G communication, etc. The HMD 102 may run an operating system and include network interfaces. In one implementation, the processor of the HMD 102 may also be communicatively connected to a controller (not shown), a glove interface object (104a of FIG. 1), one or more external cameras (109 of FIG. 1), a computer or stand-alone console (106 of FIG. 1), a router, to name a few. The glove interface object (104a of FIG. 1) is used to provide inputs to an interactive application providing content for the user to view. The external camera is used to capture images of the user wearing the HMD and forward it to the HMD or to the computer for processing. The HMD may process some of the data provided by the various components, including the sensors data, and forward the processed data to the computer 106 for further processing. The computer 106 may be used to process the data provided by the HMD 102 and provide updated content to the HMD for rendering to the user. Alternatively, the computer may forward the processed data provided by the HMD 102 to a cloud computing server for further processing. The data from the HMD 102 may be forwarded to the interactive application executing on the cloud computing server via a router and receive the content from the interactive application, which is then forwarded to the HMD 102 for rendering. Alternatively, the HMD 102 may forward the processed data directly to the interactive application executing on the cloud computing server (i.e., remote server that is part of cloud 112 of FIG. 1) via the router and, in return, receive content of the interactive application provided by the cloud computing server. When the HMD 102 directly communicates with the cloud computing device through the router, the HMD 102 will be a networked computing device.

The lights 200A-200H included in the HMD 102 are disposed on an outside surface of the frame of the HMD 102 and are used to track the HMD 102. The light 200A-200H may be configured to have specific shapes, and have the same or different colors. The lights 200A, 200B, 200C, and 200D are arranged on the outside surface on the front side of the HMD 102. The lights 200E and 200F are arranged on a side surface of the HMD 102 and the lights 200G and 200H are arranged at corners of the HMD 102. The lights 200A-200H are disposed to span the front surface and a side surface of the HMD 102. Images of the lights 200A-200H may be captured by an image capturing device (e.g., external camera 109 of FIG. 1) and used to identify a location and an orientation of the HMD 102 in the physical environment where the user wearing the HMD 102 is present. It should be noted that some of the lights 200A-200H may or may not be visible depending upon the particular orientation of the HMD 102 relative to the image capture device. Also, different portions of lights (e.g. lights 200G and 200H) may be exposed for image capture depending upon the orientation of the HMD 102 relative to the image capture device.

In some implementations, the lights 200 can be configured to indicate a current status of the HMD to others in the vicinity. For example, some or all of the lights may be configured to have a certain color arrangement, intensity settings, be configured to blink, have a certain on/off configuration, or other arrangement indicating a current status of the HMD 102. By way of example, the lights can be configured to display different configurations during active gameplay of a video game (i.e., during an active timeline or during a time the user is navigating within a scene of the video game,) versus other non-active gameplay aspects of the video game (e.g., while configuring game settings of the video game or while navigating a menu or when paused), when the interactive application is a video game. The lights 200 might also be configured to indicate relative intensity levels of gameplay. For example, the intensity of lights, or a rate of blinking may be configured to increase when the intensity of gameplay increases. In this manner, a person external to the user may view the lights on the HMD 102 and understand that the user is actively engaged in intense gameplay and may not wish to be disturbed at that moment. In other example, the lights can be configured to display distinct configurations when interacting with other interactive applications. The lights 200 are therefore used to indicate to the person of whether the user is engaged in interaction with content rendering on the HMD 102, the user's level of engagement with the content, and to the system about the location of the HMD 102 in the physical environment where the user wearing the HMD 102 is present.

The HMD 102 may additionally include one or more microphones. In the illustrated embodiment, the HMD 102 includes microphones 204A and 204B defined on the front surface of the HMD 102, and microphone 204C defined on a side surface of the HMD 102. By utilizing an array of microphones, sound from each of the microphones can be processed to determine the location of the sound's source. This information can be utilized in various ways, including exclusion of unwanted sound sources, association of a sound source with a visual identification, triangulating the sound from the sound sources to pinpoint location and orientation of the HMD 102, etc. The microphones 204A-204C are used to capture the external sounds occurring in the physical environment in which the user wearing the HMD 102 is present.

The HMD 102 may also include one or more image capture devices in addition to the external image capture device (109 of FIG. 1). In the illustrated embodiment, the HMD 102 is shown to include image capture devices 202A and 202B disposed on the outside surface on the front face of the HMD 102. By utilizing a stereoscopic pair of image capture devices, three-dimensional (3D) images and video of the environment can be captured from the perspective of the HMD 102. Such video can be presented to the user to provide the user with a "video see-through" capability while wearing the HMD 102. In this implementation, the HMD 102 is not configured with a see-through capability. Even though the user cannot see through the HMD 102 in a strict sense, the video captured by the image capture devices 202A and 202B can nonetheless provide a functional equivalent of being able to see the environment external to the HMD 102 as if looking through the HMD 102. Such video can be augmented with virtual elements to provide an augmented reality experience. The augmentation may be done by overlaying the virtual elements over the objects in the video or may be combined or blended with the objects in the video in other ways. Though in the illustrated embodiment, two cameras are shown on the front surface of the HMD 102, it will be appreciated that there may be any number of externally facing cameras installed on the HMD 102, and oriented in different directions. For example, in another embodiment, there may be cameras mounted on the sides of the HMD 102 to provide additional panoramic image capture of the environment.

In another implementation, the HMD 102 may provide a see-through capability with the display screen of the HMD 102 being transparent for the user to view the physical environment of the real-world in the vicinity of the user. In this implementation, images of the virtual elements may be super-imposed over portions of the real-world objects. The HMD 102, in this alternate implementation is configured for augmented reality applications.

Figure 8B:
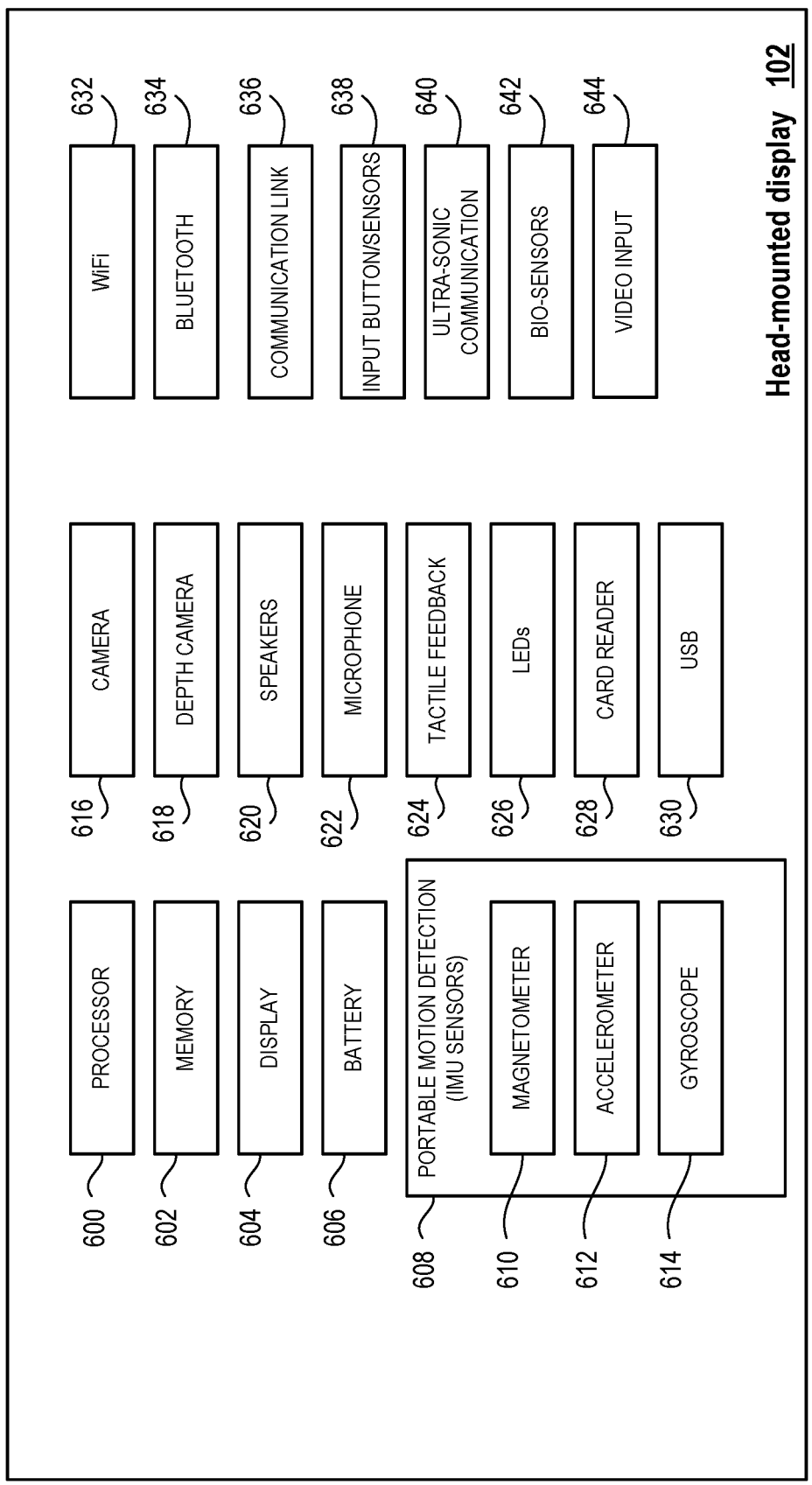
FIG. 8B illustrates various components disposed within the wearable device that are used for requesting, receiving and rendering content and to collect various data captured of the user and the user's interaction with the content, in accordance with one implementation.

FIG. 8B illustrates various components of a head mounted display 102, in accordance with one implementation of the disclosure. The head mounted display 102 includes a processor 600 for executing program instructions. A memory 602 is provided for storage purposes, and may include both volatile and non-volatile memory. A display 604 is included which provides a visual interface that a user may use to view content. A battery 606 is provided as a power source for the head mounted display 102. A motion detection module 608 may include any of various kinds of motion sensitive hardware, such as a magnetometer 610, an accelerometer 612, and a gyroscope 614.

An accelerometer 612 is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 612 are used to provide the direction of gravity, which gives an absolute reference for two angles (world-space pitch and world-space roll).

A magnetometer 610 measures the strength and direction of the magnetic field in the vicinity of the head mounted display. In one embodiment, three magnetometers 610 are used within the head mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 612 is used together with magnetometer 610 to obtain the inclination and azimuth of the head mounted display 102.

In some implementations, the magnetometers 610 of the head mounted display 102 are configured so as to be read during times when electromagnets in other nearby devices are inactive.

A gyroscope 614 is a device for measuring or maintaining orientation, based on the principles of angular momentum. In one embodiment, three gyroscopes 614 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 616 (108 of FIG. 1) is provided for capturing images and image streams of a real environment. More than one camera may be included in the head mounted display 102, including a camera that is rear-facing (directed away from a user when the user is viewing the display of the head mounted display 102), and a camera that is front-facing (directed towards the user when the user is viewing the display of the head mounted display 102). Additionally, a depth camera 618 may be included in the head mounted display 102 for sensing depth information of objects in a real environment.

The head mounted display 102 includes speakers 620 for providing audio output. Also, a microphone 622 may be included for capturing audio from the real environment, including sounds from the ambient environment, speech made by the user, etc. The head mounted display 102 includes tactile feedback module 624 for providing tactile feedback to the user. In one embodiment, the tactile feedback module 624 is capable of causing movement and/or vibration of the head mounted display 102 so as to provide tactile feedback to the user.

LEDs 626 are provided as visual indicators of statuses of the head mounted display 102. For example, an LED may indicate battery level, power on, etc. A card reader 628 is provided to enable the head mounted display 102 to read and write information to and from a memory card. A USB interface 630 is included as one example of an interface for enabling connection of peripheral devices, or connection to other devices, such as other portable devices, computers, etc. In various embodiments of the head mounted display 102, any of various kinds of interfaces may be included to enable greater connectivity of the head mounted display 102.

A WiFi module 632 is included for enabling connection to the Internet or a local area network via wireless networking technologies. Also, the head mounted display 102 includes a Bluetooth module 634 for enabling wireless connection to other devices. A communications link 636 may also be included for connection to other devices. In one embodiment, the communications link 636 utilizes infrared transmission for wireless communication. In other embodiments, the communications link 636 may utilize any of various wireless or wired transmission protocols for communication with other devices.

Input buttons/sensors 638 are included to provide an input interface for the user. Any of various kinds of input interfaces may be included, such as buttons, touchpad, joystick, trackball, etc. An ultra-sonic communication module 640 may be included in head mounted display 102 for facilitating communication with other devices via ultra-sonic technologies. Bio-sensors 642 are included to enable detection of physiological data from a user. In one embodiment, the bio-sensors 642 include one or more dry electrodes for detecting bio-electric signals of the user through the user's skin. A video input 644 is configured to receive a video signal from a primary processing computer (e.g. main game console) for rendering on the HMD. In some implementations, the video input is an HDMI input.

The foregoing components of head mounted display 102 have been described as merely exemplary components that may be included in head mounted display 102. In various embodiments of the disclosure, the head mounted display 102 may or may not include some of the various aforementioned components. Embodiments of the head mounted display 102 may additionally include other components not presently described, but known in the art, for purposes of facilitating aspects of the present disclosure as herein described.

Figure 9:
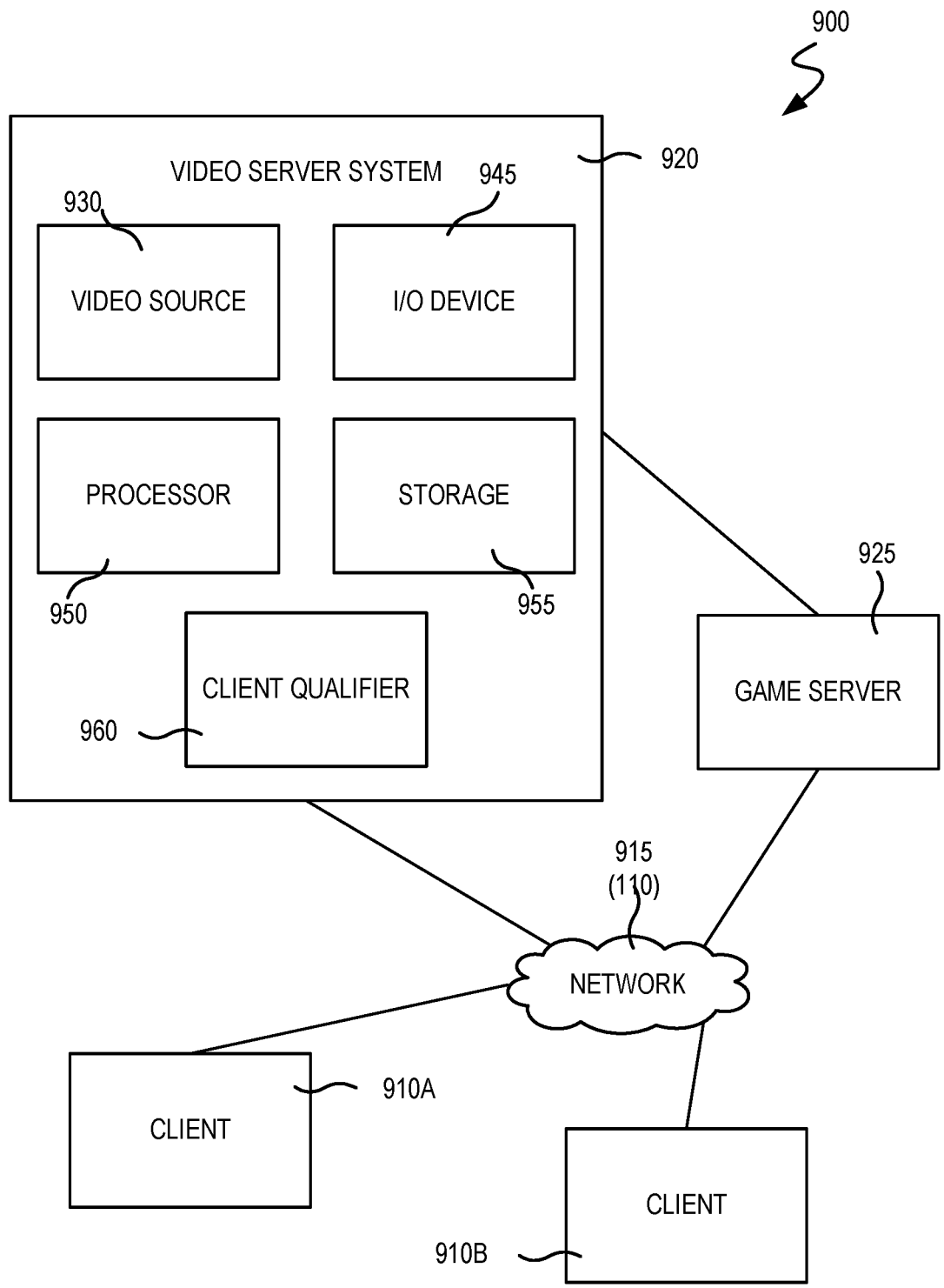
FIG. 9 illustrates components of an example system that can be used to process requests from a user, provide content and assistance to the user to perform aspects of the various implementations of the present disclosure.

FIG. 9 is a block diagram of an example Game System 900 that may be used to provide content to the HMD for user consumption and interaction, according to various embodiments of the disclosure. Game System 900 is configured to provide a video stream to one or more Clients 910 via a Network 915, wherein one or more of the clients 910 may include HMD (102), eyeglasses, or other wearable devices. In one implementation, the Game System 900 is shown to be a cloud game system with an instance of the game being executed on a cloud server and the content streamed to the clients 910. In an alternate implementation, the Game System 900 may include a game console that executes an instance of the game and provides streaming content to the HMD for rendering. Game System 900 typically includes a Video Server System 920 and an optional game server 925. Video Server System 920 is configured to provide the video stream to the one or more Clients 910 with a minimal quality of service. For example, Video Server System 920 may receive a game command that changes the state of or a point of view within a video game, and provide Clients 910 with an updated video stream reflecting this change in state with minimal lag time. The Video Server System 920 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 120 frames per second. Although higher or lower frame rates are included in alternative embodiments of the disclosure.

Clients 910, referred to herein individually as 910A, 910B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 910 are configured to receive encoded video streams, decode the video streams, and present the resulting video to a user, e.g., a player of a game. The processes of receiving encoded video streams and/or decoding the video streams typically includes storing individual video frames in a receive buffer of the Client. The video streams may be presented to the user on a display integral to Client 910 or on a separate device such as a monitor or television. Clients 910 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 910 are optionally geographically dispersed. The number of clients included in Game System 900 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 920 to deliver a game viewed through the HMD. In one embodiment, the game console receives the video stream from the video server system 920, and the game console forwards the video stream, or updates to the video stream, to the HMD for rendering.

Clients 910 are configured to receive video streams via Network 915 (110 of FIG. 1). Network 915 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 910 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 910 may, but are not required to, further include systems configured for modifying received video. For example, a Client may be configured to perform further rendering, to overlay one video image on another video image, to crop a video image, and/or the like. For example, Clients 910 may be configured to receive various types of video frames, such as I-frames, P-frames and B-frames, and to process these frames into images for display to a user. In some embodiments, a member of Clients 910 is configured to perform further rendering, shading, conversion to 3-D, or like operations on the video stream. A member of Clients 910 is optionally configured to receive more than one audio or video stream. Input devices of Clients 910 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 910 is generated and provided by Video Server System 920. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 910 are typically configured to receive inputs from a user. These inputs may include game commands configured to change the state of the video game or otherwise affect game play. The game commands can be received using input devices and/or may be automatically generated by computing instructions executing on Clients 910. The received game commands are communicated from Clients 910 via Network 915 to Video Server System 920 and/or Game Server 925. For example, in some embodiments, the game commands are communicated to Game Server 925 via Video Server System 920. In some embodiments, separate copies of the game commands are communicated from Clients 910 to Game Server 925 and Video Server System 920. The communication of game commands is optionally dependent on the identity of the command. Game commands are optionally communicated from Client 910A through a different route or communication channel that that used to provide audio or video streams to Client 910A.

Game Server 925 is optionally operated by a different entity than Video Server System 920. For example, Game Server 925 may be operated by the publisher of a multiplayer game. In this example, Video Server System 920 is optionally viewed as a client by Game Server 925 and optionally configured to appear from the point of view of Game Server 925 to be a prior art client executing a prior art game engine. Communication between Video Server System 920 and Game Server 925 optionally occurs via Network 915. As such, Game Server 925 can be a prior art multiplayer game server that sends game state information to multiple clients, one of which is game server system 920. Video Server System 920 may be configured to communicate with multiple instances of Game Server 925 at the same time. For example, Video Server System 920 can be configured to provide a plurality of different video games to different users. Each of these different video games may be supported by a different Game Server 925 and/or published by different entities. In some embodiments, several geographically distributed instances of Video Server System 920 are configured to provide game video to a plurality of different users. Each of these instances of Video Server System 920 may be in communication with the same instance of Game Server 925. Communication between Video Server System 920 and one or more Game Server 925 optionally occurs via a dedicated communication channel. For example, Video Server System 920 may be connected to Game Server 925 via a high bandwidth channel that is dedicated to communication between these two systems.

Video Server System 920 comprises at least a Video Source 930, an I/O Device 945, a Processor 950, and non-transitory Storage 955. Video Server System 920 may include one computing device or be distributed among a plurality of computing devices. These computing devices are optionally connected via a communications system such as a local area network.

Video Source 930 is configured to provide a video stream, e.g., streaming video or a series of video frames that form a moving picture. In some embodiments, Video Source 930 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 925. Game Server 925 may maintain a copy of the state of the game based on game commands received from multiple players using geographically disperse clients. In these cases, the game state is provided by Game Server 925 to Video Source 930, wherein a copy of the game state is stored and rendering is performed. Game Server 925 may receive game commands directly from Clients 910 via Network 915, and/or may receive game commands via Video Server System 920.

Video Source 930 typically includes rendering logic, e.g., hardware, firmware, and/or software stored on a computer readable medium such as Storage 955. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 910. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×920 (e.g., 920p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames.

As used herein the term "frame size" is meant to refer to a number of pixels within a frame. The term "frame data size" is used to refer to a number of bytes required to store the frame.

In alternative embodiments Video Source 930 includes a video recording device such as a camera. This camera may be used to generate delayed or live video that can be included in the video stream of a computer game. The resulting video stream, optionally includes both rendered images and images recorded using a still or video camera. Video Source 930 may also include storage devices configured to store previously recorded video to be included in a video stream. Video Source 930 may also include motion or positioning sensing devices configured to detect motion or position of an object, e.g., person, and logic configured to determine a game state or produce video-based on the detected motion and/or position.

Video Source 930 is optionally configured to provide overlays configured to be placed on other video. For example, these overlays may include a command interface, log in instructions, messages to a game player, images of other game players, video feeds of other game players (e.g., webcam video). In embodiments of Client 910A including a touch screen interface or a gaze detection interface, the overlay may include a virtual keyboard, joystick, touch pad, and/or the like. In one example of an overlay a player's voice is overlaid on an audio stream. Video Source 930 optionally further includes one or more audio sources.

In embodiments wherein Video Server System 920 is configured to maintain the game state based on input from more than one player, each player may have a different point of view comprising a position and direction of view. Video Source 930 is optionally configured to provide a separate video stream for each player based on their point of view. Further, Video Source 930 may be configured to provide a different frame size, frame data size, and/or encoding to each of Client 910. Video Source 930 is optionally configured to provide 3-D video.

I/O Device 945 is configured for Video Server System 920 to send and/or receive information such as video, commands, requests for information, a game state, gaze information, device motion, device location, user motion, client identities, player identities, game commands, security information, audio, and/or the like. I/O Device 945 typically includes communication hardware such as a network card or modem. I/O Device 945 is configured to communicate with Game Server 925, Network 915, and/or Clients 910.

Processor 950 is configured to execute logic, e.g. software, included within the various components of Video Server System 920 discussed herein. For example, Processor 950 may be programmed with software instructions in order to perform the functions of Video Source 930, Game Server 925, and/or a Client Qualifier 960. Video Server System 920 optionally includes more than one instance of Processor 950. Processor 950 may also be programmed with software instructions in order to execute commands received by Video Server System 920, or to coordinate the operation of the various elements of Game System 900 discussed herein. Processor 950 may include one or more hardware device. Processor 950 is an electronic processor.

Storage 955 includes non-transitory analog and/or digital storage devices. For example, Storage 955 may include an analog storage device configured to store video frames. Storage 955 may include a computer readable digital storage, e.g. a hard drive, an optical drive, or solid state storage. Storage 95 is configured (e.g. by way of an appropriate data structure or file system) to store video frames, artificial frames, a video stream including both video frames and artificial frames, audio frame, an audio stream, and/or the like. Storage 955 is optionally distributed among a plurality of devices. In some embodiments, Storage 955 is configured to store the software components of Video Source 930 discussed elsewhere herein. These components may be stored in a format ready to be provisioned when needed.

Video Server System 920 optionally further comprises Client Qualifier 960. Client Qualifier 960 is configured for remotely determining the capabilities of a client, such as Clients 910A or 910B. These capabilities can include both the capabilities of Client 910A itself as well as the capabilities of one or more communication channels between Client 910A and Video Server System 920. For example, Client Qualifier 960 may be configured to test a communication channel through Network 915.

Client Qualifier 960 can determine (e.g., discover) the capabilities of Client 910A manually or automatically. Manual determination includes communicating with a user of Client 910A and asking the user to provide capabilities. For example, in some embodiments, Client Qualifier 960 is configured to display images, text, and/or the like within a browser of Client 910A. In one embodiment, Client 910A is an HMD that includes a browser. In another embodiment, client 910A is a game console having a browser, which may be displayed on the HMD. The displayed objects request that the user enter information such as operating system, processor, video decoder type, type of network connection, display resolution, etc. of Client 910A. The information entered by the user is communicated back to Client Qualifier 960.

Automatic determination may occur, for example, by execution of an agent on Client 910A and/or by sending test video to Client 910A. The agent may comprise computing instructions, such as java script, embedded in a web page or installed as an add-on. The agent is optionally provided by Client Qualifier 960. In various embodiments, the agent can find out processing power of Client 910A, decoding and display capabilities of Client 910A, lag time reliability and bandwidth of communication channels between Client 910A and Video Server System 920, a display type of Client 910A, firewalls present on Client 910A, hardware of Client 910A, software executing on Client 910A, registry entries within Client 910A, and/or the like.

Client Qualifier 960 includes hardware, firmware, and/or software stored on a computer readable medium. Client Qualifier 960 is optionally disposed on a computing device separate from one or more other elements of Video Server System 920. For example, in some embodiments, Client Qualifier 960 is configured to determine the characteristics of communication channels between Clients 910 and more than one instance of Video Server System 920. In these embodiments the information discovered by Client Qualifier can be used to determine which instance of Video Server System 920 is best suited for delivery of streaming video to one of Clients 910.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

The invention claimed is:

1. A method for assisting a user of a head mounted display (HMD) during interaction with a video game, comprising:
monitoring eye strain indicators of the user as the user is interacting with a first portion of game content, the eye strain indicators collected from a plurality of sensors distributed within a physical environment in which the user is operating;
computing eye strain metrics for the user using the eye strain indicators collected from the plurality of sensors as the user is interacting with the first portion of the game content, the eye strain metrics used to determine a level of eye strain experienced by the user as the user is interacting with the first portion;
identifying and examining a second portion of the game content that is predicted to occur after the first portion to determine if the second portion includes one or more rendering attributes that are known to cause eye strain for the user, the second portion identified based on game state of the game content included in the first portion and the interactivity of the user in the first portion;
forwarding an action to the video game, the action including a command to adjust select ones of the one or more rendering attributes of the game content included in the second portion of the video game that are likely to cause the eye strain, the action identified based on the one or more rendering attributes used to present the first portion of the game content and the one or more rendering attributes identified for the game content included in the second portion; and
when the game content of the second portion is detected to be selected for rendering following rendering of the game content of the first portion and in response to receiving the action, executing the command at the video game to dynamically adjust the select ones of the one or more rendering attributes for the game content included in the second portion prior to forwarding the game content of the second portion to the HMD for rendering,
wherein operations of the method are performed by an eye strain detector engine executing on a processor of a computing system.

2. The method of claim 1, wherein the eye strain indicators correspond with one or more rendering attributes of the game content in the first portion of the game content.

3. The method of claim 2, wherein forwarding the action to the video game includes,
identifying the one or more rendering attributes of the game content included in the first portion and the second portion;
computing a second set of eye strain metrics for the user using the rendering attributes associated with the game content included in the first portion and the second portion; and
when the level of eye strain determined from the second set of eye strain metrics computed for the game content in the first and the second portions is equal to or greater than the level of eye strain determined from the eye strain metrics computed for the game content in the first portion, identifying and forwarding the action that corresponds with the rendering attributes of the game content included in the first and second portions, so as to adjust the rendering attributes of the game content in the second portion prior to forwarding the game content of the second portion to the HMD for rendering.

4. A method for assisting a user of a head mounted display (HMD) during interaction with a video game, comprising:
monitoring eye strain indicators of the user as the user is interacting with game content rendered at a display screen of the HMD, the eye strain indicators collected from images of eyes and other facial features of the user captured by a plurality of sensors distributed within a physical environment in which the user is operating;
computing eye strain metrics for the user using the eye strain indicators collected from the plurality of sensors, the eye strain metrics used to determine a level of eye strain experienced by the user as the user is interacting with the game content, the level of eye strain in the user influenced by one or more rendering attributes of the game content currently rendering at the display screen;
identifying an action to be performed on the game content, based on the eye strain metrics computed for the user, the action is a corrective action and identifies the one or more rendering attributes associated with the game content that needs to be adjusted and a command to be executed at the video game for dynamically adjusting the one or more rendering attributes of the game content identified to cause the eye strain in the user; and
forwarding the action to the video game, the action triggering execution of the command at the video game, so as to cause adjustment to the one or more rendering attributes of the game content presented subsequently to the user, the adjustment to the one or more rendering attributes is defined to reduce the eye strain of the user,
wherein the action identified to adjust the one or more rendering attributes is specific for the user, and
wherein operations of the method are performed by an eye strain detector engine executing on a processor of a computer.

5. The method of claim 4, wherein the eye strain detector engine is integrated within an operating system of the computer that is communicatively connected to the video game providing the game content to the user or integrated within the video game providing the game content.

6. The method of claim 4, wherein the command is executed to adjust the one or more rendering attributes of a subsequent portion of the game content, upon verifying that the subsequent portion of the game content includes the one or more rendering attributes that have potential to cause eye strain for the user.

7. The method of claim 4, wherein the eye strain metrics for the user is computed as a function of an amount of time the user spent interacting with the game content.

8. The method of claim 4, wherein the eye strain indicators monitored include direct eye strain indicators and indirect eye strain indicators, wherein the direct eye strain indicators are determined from images captured by the plurality of sensors and the indirect eye strain indicators are derived from the direct eye strain indicators.

9. The method of claim 4, wherein the eye strain metrics are computed using an eye strain artificial intelligence (AI) model generated and trained by a machine learning engine using the eye strain indicators.

10. The method of claim 9, wherein the machine learning engine identifies and applies a distinct weight to each of the eye strain indicators collected from the user, and the eye strain AI model is configured to take into consideration relative weight accorded to each of the eye strain indicators when computing the eye strain metrics.

11. The method of claim 9, wherein the eye strain AI model is used to compute the eye strain metrics for a first portion of the game content using the eye strain indicators collected from the user during rendering of the first portion of the game content, and
wherein the eye strain AI model and the eye strain metrics are updated in accordance to changes detected in said eye strain indicators collected from the user during interaction with a second portion of the game content, said changes in the eye strain indicators of the user correlating with changes detected in the rendering attributes used to present the second portion of the game content.

12. The method of claim 4, wherein the eye strain indicators are monitored and collected periodically during the interaction of the user with the game content.

13. The method of claim 4, wherein the command included in the action for adjusting said rendering attributes of the game content include instructions for adjusting the rendering attributes of the game content gradually.

14. The method of claim 4, wherein computing the eye strain metrics used to adjust rendering attributes of the game content further includes,
defining a matrix of criteria having a plurality of elements, wherein each element of the plurality of elements of the matrix is defined by a criterion involving one or more eye strain indicators, wherein each eye strain indicator of said one or more eye strain indicators is influenced by one or more rendering attributes used to present a portion of the game content;
assigning a weight for said each eye strain indicator used to define said criterion of the matrix, the weight assigned based on extent of influence said each eye strain indicator has in causing the eye strain for the user; and
computing a composite value for said each element of the matrix as a function of the weight assigned to said each eye strain indicator used to define respective element of the matrix, the composite value quantifying an extent of influence said each eye strain indicator has in causing the eye strain experienced by the user during interaction with said portion of the game content.

15. The method of claim 14, wherein said each criterion is defined to consider effect of time on said each eye strain indicator used to define said each criterion, and wherein said time used to define said each criterion includes interaction time and amount of time certain ones of the rendering attributes corresponding to said each eye strain indicator were in effect during presentation of the game content when the eye strain indicators were collected from the user.

16. The method of claim 14, wherein computing said eye strain metrics includes, predicting a subsequent portion of the game content that is likely to be rendered for the user following said portion of the game content, the subsequent portion predicted based on game state associated with said portion of the video game and game inputs provided by the user;

evaluating the subsequent portion of the game content that is predicted to occur to determine the rendering attributes included therein; and predicting eye strain indicators that are likely to be exhibited by the user during interaction with said subsequent portion of the game content that is predicted to be rendered to the user following said portion of the game content, the predicting of said eye strain indicators for the subsequent portion based on the eye strain indicators in said portion of the game content and the rendering attributes included in the subsequent portion of the game content, the predicted eye strain indicators for the subsequent portion used in updating the eye strain metrics computed for the user, wherein the predicted eye strain indicators used to proactively generate a new action to dynamically adjust the rendering attributes of the subsequent portion of the game content, the adjustment to the rendering attributes of the subsequent portion defined to reduce the eye strain of the user.

17. The method of claim 16, wherein the new action is identified to include the rendering attributes that correspond with the eye strain indicators predicted to be exhibited by the user during interaction with the subsequent portion of the game content, the new action identifying an amount by which said one or more rendering attributes corresponding to the eye strain indicators of the subsequent portion is to be adjusted, wherein an amount of adjustment of each said one or more rendering attributes defined in accordance to amount by which said one or more of the eye strain indicators exceeds a pre-defined threshold.

18. The method of claim 14, wherein the matrix of criteria is defined to be specific for the video game and is defined in accordance with a type associated with the video game and the rendering attributes associated with the game content of the video game.

19. The method of claim 14, wherein the action identified is specific for the user and is defined in accordance to the rendering attributes associated with the game content and the eye strain indicators collected from the user.

20. The method of claim 4, further includes receiving audio input from the user while the user is interacting with the game content, the audio input used as an additional input to reinforce the eye strain metrics determined from the eye strain indicators collected from the user.

21. The method of claim 4, wherein the action includes suggestions for rendering to the user, the suggestions provided in a pop-up window to inform the user of a status of the video game and to include a warning.

22. The method of claim 4, wherein the eye strain metrics are computed by calibrating the eye strain indicators of the user when not wearing the HMD to establish baseline level of the eye strain indicators of the user and comparing each of the eye strain indicators collected from the user when the user is interacting with the game content against corresponding one of the baseline level eye strain indicators calibrated for the user to compute the eye strain metrics that is indicative of eye strain and the level of eye strain experienced by the user, and wherein the baseline level of the eye strain indicators calibrated for the user are specific for the user.

* * * * *